Nov. 10, 1964  R. G. SEYL  3,156,631
METHOD OF MEASURING CORROSION OF ELECTRONIC CONDUCTORS
BY NON-GASEOUS IONIC CONDUCTORS
Filed Sept. 16, 1959  6 Sheets-Sheet 1
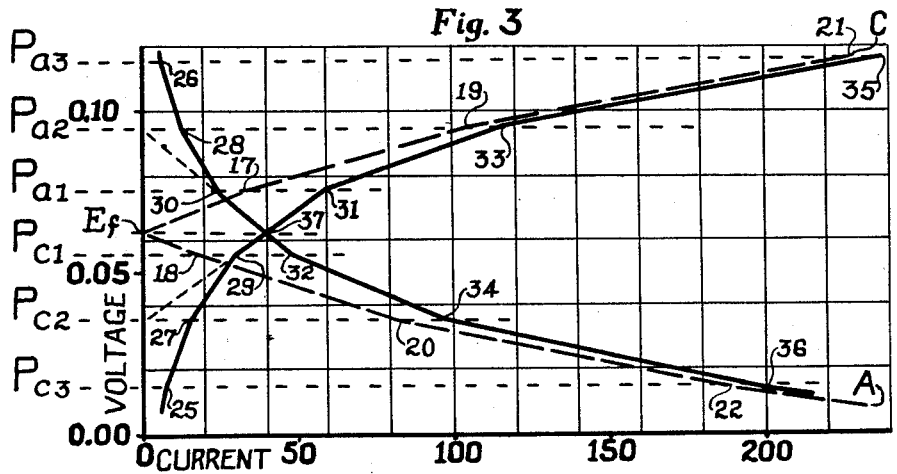
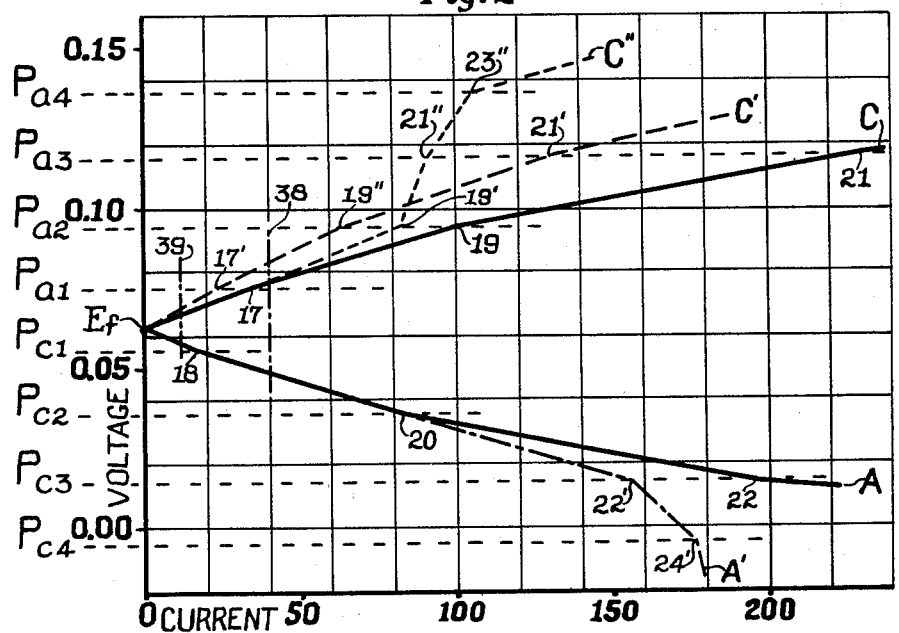
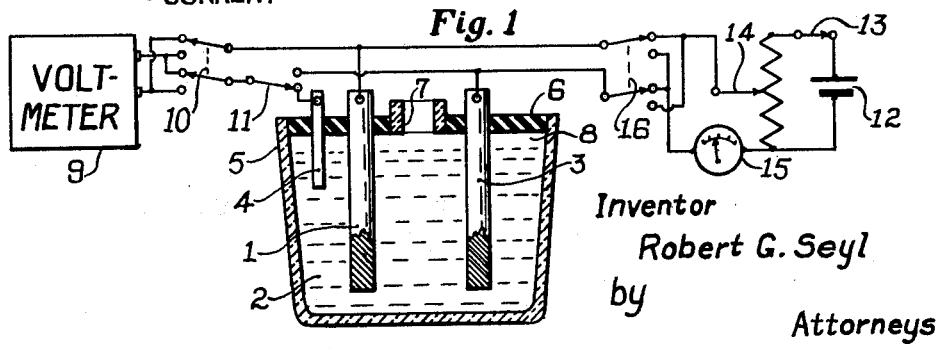
Inventor
Robert G. Seyl
by
Attorneys Nov. 10, 1964   R. G. SEYL   3,156,631
METHOD OF MEASURING CORROSION OF ELECTRONIC CONDUCTORS
BY NON-GASEOUS IONIC CONDUCTORS
Filed Sept. 16, 1959   6 Sheets-Sheet 5

INVENTOR
Robert G. Seyl
by

ATTORNEYS

INVENTOR
Robert G. Seyl
by

ATTORNEYS

United States Patent Office 3,156,631
Patented Nov. 10, 1964

3,156,631
METHOD OF MEASURING CORROSION OF ELECTRONIC CONDUCTORS BY NON-GASEOUS IONIC CONDUCTORS
Robert G. Seyl, 1123 Mulford St., Evanston, Ill.
Filed Sept. 16, 1959, Ser. No. 840,266
8 Claims. (Cl. 204—1)

This invention relates to methods of measuring the corrosion of electronic conductors by non-gaseous ionic conductors, and is a continuation-in-part of my co-pending application Serial No. 778,211, filed December 4, 1958, now abandoned, which is in turn a continuation-in-part of my co-pending application Serial No. 659,459, filed May 15, 1957, now abandoned, which is in turn a continuation-in-part of my application Serial No. 282,935, filed April 18, 1952, now abandoned, which is in turn a continuation-in-part of my application Serial No. 786,499, filed November 17, 1947, and now abandoned.

DEFINITIONS

Some terminology used in the art requires more specific definition when applied to this invention, and these definitions follow.

An electronic conductor conducts D.C. current by electron flow. Elemental metals and their alloys typify electronic conductors, but the class includes substances which do not have metallic properties, as carbon and graphite, and certain chemical compounds as oxides and sulfides.

A non-gaseous ionic conductor consists of an electrolyte dissolved in an ionizing solvent, and conducts D.C. current by the flow of positive ions in one direction and the flow of negative ions in the opposite direction. The "ionic conductor" hereinafter referred to excludes the gaseous type of ionic conductor also known to the art.

A corrosion interface is here defined as that boundary region between the surface of an electronic conductor and an ionic conductor in contact therewith, within which occur the electrochemical corrosion reactions of ion formation and discharge produced by electric current, and within which these corrosion reactions may be affected by films formed on the electronic conductor surface by physical adsorption, electrochemical migration, chemical combination, mechanical application, and other means.

The voltage existing across the interface bounding electronic and non-gaseous ionic conduction is not directly measurable. It is indirectly measured as the voltage difference between said electronic conductor and the electronic conductor of a reference electrode in electrical contact with the ionic conductor, and is termed the electrode potential, with the nature of the reference electrode also identified.

Free Electrode Potential is here defined as the electrode potential existing when the interface bounding electronic and non-gaseous ionic conduction is free from voltage disturbances produced by or momentarily resulting from externally produced current passed through the interface.

When a D.C. current is passed through the interface bounding electronic and non-gaseous ionic conduction, the voltage across the interface becomes altered in value and a polarized electrode potential results. Polarization voltage is here defined as the difference between the polarized electrode potential and the Free Electrode Potential.

New terminologies essential to describing novel details of this invention are set out through the use of word capitalizations in the specification and claims which follow.

OBJECTS

The principal object of this invention is the provision of a method for measuring the corrosion rate of an electronic conductor surface corroded by a non-gaseous ionic conductor.

Another object of this invention is the provision of a method of the foregoing character which includes measuring the corrosion current of an electrochemical mechanism at any instant during the progress of the corrosion without disturbing the corrosion interface.

Another object of this invention is the provision of a method of the foregoing character which operates independently of the composition and operating conditions of the corrosion interface.

An additional object is the application of the method of this invention to the measurement of variation in valence change in anodic electrochemical corrosion reaction produced by some combinations of composition and operating conditions of the corrosion interface.

A further object is the application of the electrochemical corrosion mechanism measured by the method of this invention to measurement of the reduction in corrosion rate produced by cathodic D.C. current density passed to the corroding surface and the acceleration of corrosion rate occurring when anodic D.C. current density is passed from the corroding surface.

PRELIMINARY DESCRIPTION

My invention starts with the concept that the Free Electrode Potential of each Interface Electrode contributing to an electrochemical corrosion mechanism is measurable from the potential at which a measurable change of slope may occur in initial range of current-potential relationship when measured on the corrosion interface with precision and detail and graphed to linear current and voltage axes. This change of slope, occurring at a substantially single value of current and potential, is here termed a Transition Point. In attempting measurement by techniques known to the art, I observed that the initial range of current-potential relationship of a corrosion interface is generally characterized by a drift in value of polarizing D.C. current and resulting polarized electrode potential occurring in an apparently erratic manner and over an indefinite time interval. This drifting interferes with the precision and detail of measurement required to detect the Transition Points which occur at small voltage differences and with small angles of slope change. I have devised a measurement method which overcomes this difficulty to the extent of substantially eliminating data point scattering beyond the electrical precisions of current and potential measurement when made with high sensitivities. This method depends mainly upon applying the D.C. voltage which produces the polarizing D.C. current through a voltage delivery system causing the current-potential relationship to approach equilibrium in a reproducible manner, measuring each successive value of polarizing D.C. current and polarized electrode potential upon the initial attainment of a rate of change of the current-potential relationship selected to be slightly greater than the rate of change produced by the drifting, and making the measurements with small voltage separation between successively measured values of polarized electrode potential to define range of current-potential relationship extending between consecutive Transition Points. A large volume of measurements made with this method show that a series of Transition Points of line slope change occur within initial anodic and cathodic range of current-potential relationship and that this series is characterized by a constant value of voltage separation between consecutive Transition Points which remains independent of wide scope of variation made in composition and operation of the corrosion interface and in interface area.

The additional concept that the conduction mechanism of the corrosion interface results from conductions of the Interface Electrodes suggests the possibility of measuring Interface Electrode corrosion mechanism by resolving initial anodic and cathodic ranges of current-potential relationship measured on the corrosion interface into component anodic and cathodic ranges of current-potential relationship occurring to the Interface Electrodes. If the Interface Electrodes are regarded to be in the form of the electrode known to the art, difference in Free Electrode Potential would be caused by difference in composition of electrode area, so that each electrode would have characteristically different anodic and cathodic polarabilities. The consequence of this is that resolving operations are impossible because of lack of any relationship between individually different Interface Electrode properties. My invention continues through the concept that an irregular order of line slope change occurring through a series of Transition Points is not caused by Interface Electrodes having individualistic and unrelated polarabilities, but is produced by distortion of measured current-potential range. When range of current-potential relationship is measured on a corrosion interface of composition and constant operating conditions selected to resist distortion by the polarizing D.C. current, and when measurement is made over an interval of time when the corrosion rate is not changing, a regular order of line slope change may occur through the series of Transition Points, indicating that the Interface Electrodes operate as an Interface Electrode System of inter-related anodic polarabilities and cathodic polarabilities. Resolving operations become possible through a concept termed the Line Slope Voltage, which defines the form of the inter-related polarabilities. The resolving operations are extended to range of current-potential relationship measured on a corrosion interface of unrestricted composition and operation through the concept that negligible distortion of corrosion interface properties occurs in measurement of the Transition Point of smallest polarization voltage, and through extrapolations made from this Transition Point which are based upon the regular order of performance of the Interface Electrode System and which enable the operations of resolving to be applied in simplified form.

It is generally found that in the absence of corrosion rate acceleration by dissolved oxygen, measurement of the corrosion current of the Interface Electrode System at spaced time intervals during the corrosion produces a current-time relationship which may be integrated to a quantity-time relationship, through application of Faraday's law of electrolysis with valence change of anodic electrochemical reaction in accord with corrosion product valence, and that this quantity-time relationship then measures quantity of metal loss within the precision of its measurement by weighings made on duplicated electrodes. With certain interface compositions, and particularly in the presence of dissolved oxygen, it is found the valence change of anodic electrochemical reaction may generally be less than the corrosion product valence, but related to corrosion product valence according to mathematical order, which permits measurement of corrosion quantity-time relationship with substantially unimpaired accuracy.

The Interface Electrode System operates according to mathematical proportionality of voltage and current, so that the amount by which the corrosion current occurring at the Free Electrode Potential of the corrosion interface may be altered by either anodic or cathodic D.C. current density passed through the corrosion interface during its corrosion may be accurately calculated from the polarization voltage produced by said anodic or cathodic D.C. current density.

The corrosion current of the Interface Electrode System may measure corrosion rate within an accuracy of about ±5%, and this accuracy substantiates inventive concepts and measurement method operation.

THE ART

Corrosion rate measurement is employed in the art to develop new metal alloys, corrosion inhibitors and protective coatings, and to evaluate and control corrosives, corrosion accelerators, and corrosive environments. Although the art speaks of "corrosion rate," it relies upon physical measurement of quantity of metal loss occurring through a measured time interval followed by the calculation, rate=(quantity)/(time). Objectionable properties of this method include the following:

(1) The method is slow. A period of days or weeks may be required before the measurement can be made.

(2) The method is uninformative. The calculated corrosion rate means no more than an averaging of all rate variations occurring during the time required to produce measurable quantity of metal loss. Information on corrosion mechanism is limited to visual inspection for localized corrosion.

(3) The method is destructive. Measurement requires removal of metal surface from the corrosive and cleaning of the metal surface, which interrupt the corrosion and disturb its trend.

(4) The method is costly. Cost factors include the need for a plurality of duplicated metal surfaces to obtain reasonable measurement precision, the need for a large number of duplicated metal surfaces to measure a trend of corrosion, the labor cost of preparing, weighing, inserting, removing, cleaning, and again weighing each metal surface for a single measurement, and the cost of interrupting plant equipment to insert and remove test metal surfaces.

The art includes explorations of the possibilities of measuring an electrochemical corrosion mechanism. The most fundamental electrode known to the art consists of an area of pure elemental electronic conductor surface in contact with a non-gaseous ionic conductor operating under specific corrosive environment, and is characterized by an open-circuit electrode potential and resistance to the passage of D.C. current described through anodic and cathodic curves of current-potential relationship. With uniform corrosion, in which the metal surface undergoes a fine uniform etch, laboratory microscopic techniques are reported to indicate potential difference to occur between metal crystal surface and intercrystal compound, but no practical method for measuring the short-circuit current is described.

The art includes several alternative laboratory techniques for demonstrating that localized corrosion operates in part through the mechanism of a short-circuited two-electrode battery. Laboratory conditions are selected to produce a localized area of intensified attack, sufficiently stabilized within a visible boundary to permit removal of the entire metal surface from the corrosive, mechanical separation of the area of intensified attack from the remaining area for electrical insulation from it, the connection of an insulated electrical lead wire to each area, and return of the assembly to the corrosive for measurement as a two-electrode battery during the short period through which the intensified attack remains confined within its initial boundary. Demonstration is thereby made that the area of intensified attack is anodic to the remaining surface area, and that the short-circuit current contributes toward determining the corrosion rate. The laboratory technique required for such demonstration is more complicated than weight loss measurement, and cannot be applied to the forms in which localized corrosion occurs in practice.

The art has known for a long time that when a D.C. current is passed through a two-electrode battery or electrolytic cell, polarization voltage develops at the electrode interfaces in opposition to the voltage producing the current flow, and causes a decrease in the value of the polarizing D.C. current. The somewhat vague techniques in the art for measuring current-potential relationship are based upon measurement of steady state values occurring after equilibrium is reached between polarizing D.C. current and polarization voltage. Such measurement may be applied with precision to the two-electrode battery or electrolytic cell which is frequently operated for hours at a practically constant value of current. Measurement of current-potential relationship range made in the art on corrosion interfaces, pertains to localized corrosion produced by dissimilar metal surface area or localized area of intensified attack developed within a single metal surface. The time of measuring current and potential is broadly aimed at the steady state condition, and data point scattering does not interfere with drawing a smooth curve through the graphed data points. Attempts are reported in the art to measure the open-circuit potential of anodic area of localized corrosion without insulating the anodic area from the cathodic area, through measurement of a range of cathodic current-potential relationship passing through the anticipated open-circuit potential. In a few instances evidence indicated that the region of anodic potential was identifiable as a zone of smaller radius of curvature, but in general change in curvature was insufficient to insure that the intended measurement was being made, and frequently no change in curvature was observed.

THE FIGURES

FIGURE 1 is a diagrammatic section illustrating essential components of measuring apparatus;

FIGURE 2 is a graph showing variations in shape of initial current-potential relationship range measured by the method of this invention;

FIGURE 3 shows undistorted ranges of anodic and cathodic current-potential relationship measured by the method of this invention, and shows the corrosion mechanism of the Interface Electrode System measured therefrom by resolving operations of this invention;

FIGURES 5 through 12, inclusive, are diagrammatic illustrations of certain resolving operations set forth in the specification, which operations are utilized in obtaining data of the type illustrated in FIGURE 3.

INTERFACE ELECTRODE CONCEPTS

Figure 4:
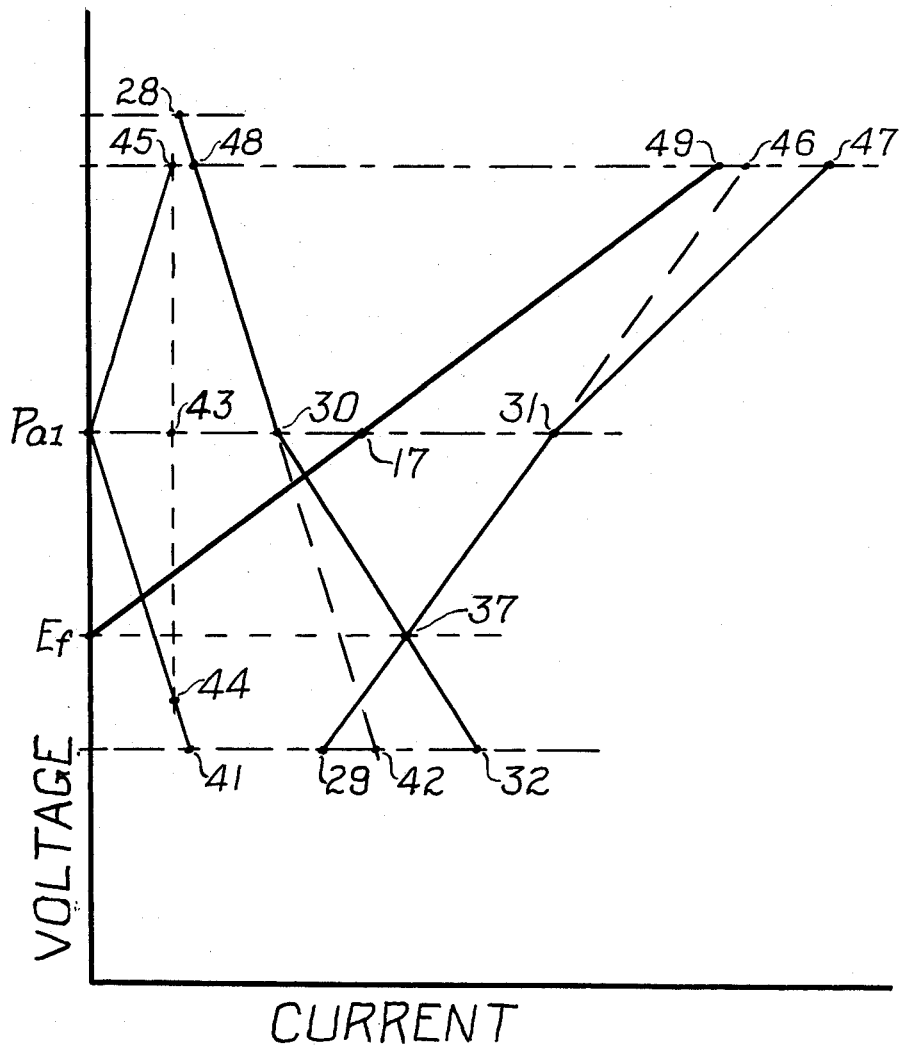
FIGURE 4 is a diagrammatic graph predicting the occurrence and significance of a Transition Point of line slope change in initial range of current-potential relationship when measured in detail by the precision method of this invention.
Figure 5:
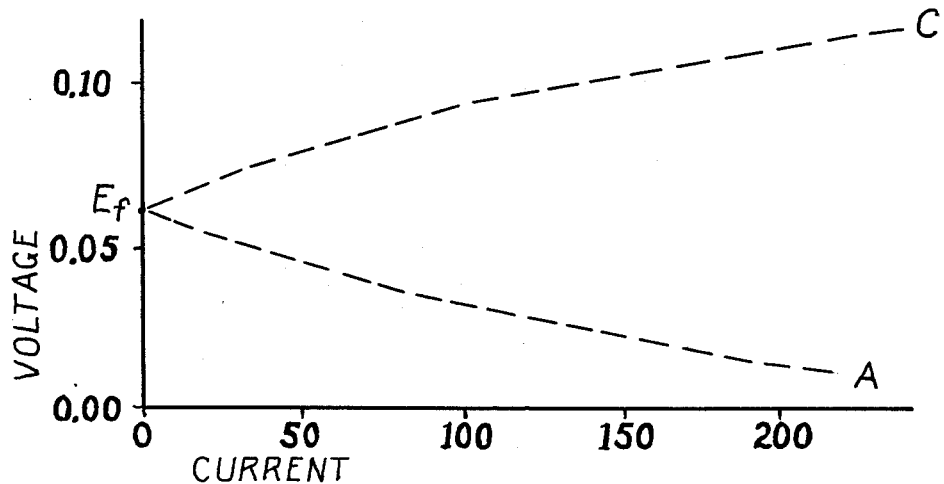

A portion of Interface Electrode corrosion mechanism is included in FIGURE 4 to the extent of showing the manner in which it may shape initial range of current-potential relationship measurable on the corrosion interface. This showing is referred to later in describing the method of measuring initial range of current-potential relationship and the operations of resolving measured relationship ranges into the component relationship ranges of the Interface Electrode corrosion mechanism.

Linear units of voltage and current are omitted from the voltage and current axes for the purpose of generalization. The showing of current-potential relationship ranges as linear is justified by regarding them to extend through such small ranges of voltages and current that curvature, if present, is negligible.

This invention is based upon the concept that the contacting of a single electronic conductor surface with a non-gaseous ionic conductor activates a plurality of Interface Electrodes, some of which operate as anodes and others of which operate as cathodes when the interface corrodes at its Free Electrode Potential. In FIGURE 4, $P_{a1}$ is the Free Electrode Potential of an Interface Electrode operating as an anode when the interface corrodes at its Free Electrode Potential. Additional Interface Electrodes of more anodic potential than $P_{a1}$ are regarded to be anodically polarizable along line 28–30. Additional Interface Electrodes of more cathodic potential than $P_{a1}$ are regarded to be cathodically polarizable along line 29–31.

The Interface Electrode having a Free Electrode Potential at $P_{a1}$ contributes to the corrosion current of the Interface Electrode mechanism as follows. This Interface Electrode is regarded to be anodically polarizable along line $P_{a1}$–41. The extension of line 28–30 to point 42 at the potential of point 41 describes the anodic polarization of other Interface Electrodes. The value of current at point 41 is added to the value of current at point 42 to locate the total anodic current at point 32. The total current of all Interface Electrodes operating as anodes then continues from line 28–30 through line 30–32. When no D.C. current is passed through the corrosion interface from a separate and opposed interface, the corrosion occurs at the current and potential at which the total anodic current from Interface Electrodes operating as anodes equals the total cathodic current from Interface Electrodes operating as cathodes. Intersection point 37 between total cathodic polarization line 29–31 and total anodic polarization line 30–32 measures the Free Electrode Potential $E_f$ of the corrosion interface, and the accompanying corrosion current of the Interface Electrode mechanism.

The mechanism through which the corrosion interface conducts current and is polarized, is regarded to be that of the Interface Electrode corrosion mechanism. When a value of polarizing D.C. current is passed through the corrosion interface, the measurable current-potential relationship of the corrosion interface is regarded to be that of the relationship between the electrode potential to which the interface is polarized, and the difference in current occurring at this potential between the total anodic current conducted by all Interface Electrodes then operating as anodes and the total cathodic current conducted by all Interface Electrodes then operating as cathodes.

The form of current-potential relationship measurable on the corrosion interface from potential $E_f$ to potential $P_{a1}$ is explained as follows. A D.C. current is passed through the corrosion interface from an opposed interface to cathodically polarize the corrosion interface to the potential $P_{a1}$. The cathodic polarization of all Interface Electrodes then operating as cathodes is increased along line 29–37 to point 31 at potential $P_{a1}$. The difference between the current at point 31 and the current at point 37 measures that part of the D.C. current required to produce this increase of cathodic Interface Electrode polarization. The anodic polarization of all Interface Electrodes then operating as anodes is decreased along line 37–30 to point 30 at potential $P_{a1}$. The difference between the current at point 37 and the current at point 30 measures that part of the D.C. current required to replace current conducted to Interface Electrodes operating as cathodes by Interface Electrodes operating as anodes. The total value of the D.C. current passing through the corrosion interface is therefore equal to the difference between the current at point 31 and the current at point 30, and is shown in FIGURE 4 by point 17 at potential $P_{a1}$. A line from point $E_f$ to point 17 defines an initial range of current-potential relationship measurable on the corrosion interface.

If the cathodic polarability of an Interface Electrode is equal to its anodic polarability, a Transition Point of line slope change does not occur when the range of current-potential relationship measured on the corrosion interface is passed through the Free Electrode Potential of the Interface Electrode. To show line $P_{a1}$–45 of cathodic polarability equal to the anodic polarability of line $P_{a1}$–41, a line parallel to the voltage axis is drawn through a point 43 at potential $P_{a1}$. The voltage difference between points 45 and 43 along this line is made equal to the voltage difference between points 43 and 44. When the cathodic polarization of the corrosion interface is increased beyond potential $P_{a1}$ by the D.C. current passed through it, the Interface Electrode of Free Electrode Potential $P_{a1}$ is cathodically polarized along line $P_{a1}$–45. Other Interface Electrodes operating as cathodes are polarized along line 37–31 to point 46 at the potential of point 45. Adding the current at point 45 to the current at point 46 locates point 47. Line 31–47 then defines the polarization of all Interface Electrodes operating as cathodes. All Interface Electrodes operating as anodes are depolarized along line 30–28 to point 48 at the potential of point 45. The value of the D.C. current required to polarize the corrosion interface to the potential of point 45 is that of a point 49 at a value of current equal to the difference in current between points 47 and 48. The corrosion interface is polarized along measurable line 17–49 which is seen to be a continuation of line $E_f$–17 caused by the Interface Electrode of Free Electrode Potential $P_{a1}$ requiring the same current-potential relationship to replace its anodic conduction as is required to produce its cathodic conduction.

When the cathodic polarability of an Interface Electrode differs from its anodic polarability, a Transition Point of line slope change occurs as the range of current-potential relationship measured on the corrosion interface is passed through the Free Electrode Potential of the Interface Electrode. If point 45 occurred at a larger value of current, point 47 would occur at a larger value of current, so that line 17–49 would have less slope than line $E_f$–17. If point 45 occurred at a smaller value of current point 47 would occur at a smaller value of current, so that line 17–49 would have greater slope than line $E_f$–17. In either case, point 17 would be defined at a single value of current and potential.

MEASUREMENT OF CURRENT-POTENTIAL RELATIONSHIP RANGE

Current-potential relationship is measured on the corrosion interface in range to substantially include the Free Electrode Potential of the corrosion interface and extending to include at least the first Transition Point of line slope change, as follows, using apparatus shown diagrammatically in FIGURE 1.

The corrosion interface to be measured is formed by contacting a single surface of electronic conductor 1 with ionic conductor 2. A separate and opposed interface, required for passing the D.C. current through the interface to be measured, is formed by contacting a surface of electronic conductor 3 with ionic conductor 2.

FIGURE 4 shows that a Transition Point 17 can occur at a single value of polarizing D.C. current and polarized electrode potential. Maximum precision of Transition Point measurement therefore requires that the polarizing D.C. current produce the same polarized electrode potential on all elements of area of the measured interface. The extent to which this may be accomplished is limited by the frequent occurrence of localized corrosion within the measured interface. Anodic area of localized corrosion is short-circuited to cathodic area through paths of ionic conduction. Ionic conductor resistance may produce a small voltage drop between anodic and cathodic area, causing the Free Electrode Potential and the polarized electrode potential to occur within a range of potential equal to this voltage drop.

The area of the interface to be measured and the area of the separate and opposed interface are formed with a combination of regularity in shape, size, and opposed position selected to substantially maintain range of variation in polarized electrode potential of the measured interface within range of variation occurring to the Free Electrode Potential. This may be accomplished by forming the paths of ionic conduction passing the polarizing D.C. current between the two interfaces within the uniformity required to substantially maintain range of voltage variation delivered to the measured interface within range of variation occurring to the Free Electrode Potential. FIGURE 4 shows that this is not the "uniform current density" criteria known to the art. A D.C. current cathodically polarizing the interface to a potential between $E_f$ and $P_{a1}$ passes only to Interface Electrodes operating as cathodes, so that maximum deviation from uniform current density occurs. Uniform current density tends to be approached after all Interface Electrodes become cathodically polarized, and this requires value of D.C. current much greater than that employed in the method of this invention.

FIGURE 1 illustrates one combination in which the measured interface and the separate and opposed interface may be formed. The electrodes are in the form of rods of identical dimensions, with rod diameter made small compared to rod length and major axes placed in parallel relationship. Rod diameter is diminished with decrease of ionic conductor conductivity, and may range from about one centimeter with ionic conductors of good conductivity to about two millimeters with ionic conductors of small conductivity approaching that of distilled water. The interface area is produced primarily through selection of rod length.

The reference electrode required for electrode potential measurement is established within the ionic conductor at a separation distance from the measured interface sufficient to include total polarization voltage produced on the measured interface by the polarizing D.C. current. A separation distance of no less than about ⅛ inch has proven satisfactory, and is regarded to include mechanical and concentration polarizations and chemical polarization if such occurs. The separation distance also tends to produce an average measurement of the range of variation within which the electrode potential may occur. The justification for including all sources of polarization voltage in the polarized electrode potential measurement is confirmed by the accuracy obtained in measuring corrosion rate.

The reference electrode is also positioned to substantially exclude voltage produced by ionic conductor resistance to the conduction of the polarizing D.C. current. This may be accomplished by separating the reference electrode from the measured interface by a distance no greater than about ¾ inch with ionic conductors of medium conductivity. With ionic conductors of low conductivity, the positioning shown in FIGURE 1 may be required, in which reference electrode 4 is positioned to locate measured electrode 1 between opposed electrode 3 and reference electrode 4.

A D.C. voltage delivery system through which voltage is applied to electronic conductors 1 and 3 is selected from a class producing substantially reproducible manner of approach of the current-potential relationship toward equilibrium. For reasons explained later, measurement is to be made of the polarizing D.C. current and the resulting polarized electrode potential at the time when the current-potential relationship initially attains a selected small rate of change. A reproducible manner of approach of the current-potential relationship to this small rate of change increases the precision with which the time of measurement is defined, and this in turn minimizes data point scattering caused by variability in extent of approach toward equilibrium. Two classes of voltage delivery system meeting this requirement are broadly illustrated in FIGURE 1 by battery 12, battery switch 13 and potentiometer 14, as follows.

One class of D.C. voltage delivery system produces substantially reproducible manner of approach of the current-potential relationship to a selected small rate of change by delivering each successive increment of applied voltage with uniformity of voltage regulation. The amount of voltage regulation through which an increment of D.C. voltage is applied determines the manner of approach of the current-potential relationship toward slow rate of change as follows. With high voltage regulation, an increment of applied D.C. voltage remains practically constant so that the current-potential relationship approaches slow rate of change mainly in the manner of decreasing rate of change of decreasing polarizing D.C. current. The rate of change of the current-potential relationship is measurable from rate of change of the polarizing D.C. current. With intermediate voltage regulation, an increment of applied D.C. voltage increases moderately as the polarizing D.C. current decreases, so that the current-potential relationship approaches slow rate of change in the manner of decreasing rate of change of increasing polarization voltage and decreasing rate of change of decreasing polarizing current. Rate of change of current-potential relationship is measurable from rate of change of either the polarizing D.C. current or the polarized electrode potential. With low voltage regulation, an increment of applied D.C. voltage increases appreciably while the polarizing D.C. current may change little, so that the current-potential relationship approaches slow rate of change mainly in the manner of decreasing rate of change of increasing polarization voltage. Rate of change of current-potential relationship is measurable from rate of change of the polarized electrode potential. The precision of current-potential relationship measurement remains independent of extent of voltage regulation selected, provided that sufficient measurement sensitivity is available to measure rate of change of the current-potential relationship from rate of change of the polarizing D.C. current or of the polarized electrode potential.

Uniform voltage regulation is produced by connecting potentiometer 14 of fixed total resistance across battery 12 through switch 13, and by applying each D.C. voltage increment from an incremental advancement of the potentiometer arm made at the time of applying the voltage increment and maintained until after measurement is made of the polarizing D.C. current and the resulting polarized electrode potential. The amount of voltage regulation produced is then determined through selection of battery voltage and potentiometer resistance. A selected amount of voltage regulation may alternatively be produced by manual adjustments made to the potentiometer arm after application of the D.C. voltage increment, as through adjustments made to maintain the applied voltage constant, or as through adjustment made to maintain the polarizing D.C. current constant.

Another class of D.C. voltage delivery system produces substantially reproducible manner of approach of the current-potential relationship toward equilibrium by continuously delivering the D.C. voltage at a substantially constant rate of change made equal to the selected slow rate of change at which measurement is made of the polarizing D.C. current and the polarized electrode potential. The arm of potentiometer 14 is driven at a selected constant speed to deliver the D.C. voltage at the selected rate of change.

A voltage delivery system is selected from either of these two classes described above. The accuracy with which the corrosion current may be measured is not dependent upon the specific voltage delivery system selected. The class which delivers increments of D.C. voltage requires the simplest form of measurement equipment. The class which continuously delivers the D.C. voltage at a selected slow rate of change permits elaboration of the measurement equipment to the extent of continuously recording range of current-potential relationship measured continuously.

Measurement may be started at any time after electronic conductors 1 and 3 are placed in contact with ionic conductor 2. Generally the time of making the measurement is selected with a specific purpose in mind.

In starting measurement of a range of current-potential relationship, the selected D.C. voltage delivery system is operated to deliver D.C. voltage to the electronic conductor of the measured interface and to the electronic conductor of the opposed interface of value to polarize the measured interface to an electrode potential occurring at the time of measuring the current and the potential which defines one limit to the range of current-potential relationship to be measured. This may be at the minimum polarization voltage of the range of current-potential relationship to be measured, with each successive measurement made at an increased value of polarized electrode potential, or it may be at the maximum polarization voltage of the range of current-potential relationship to be measured, with each successive measurement made at a decreased value of polarized electrode potential. Actual measurement of the Free Electrode Potential of the corrosion interface may sometimes be convenient, but it is not required since the measurement may be indirectly made by extrapolation of the initial linear relationship of the measured current-potential relationship range to zero current. The maximum polarization voltage of the range to be measured may extend to include measurement of from one to a plurality of Transition Points of line slope change, according to details of corrosion mechanism measurement which follow later in the specification.

Measurement is made of the value of the polarizing D.C. current passing through the measured interface and the value of the resulting polarized electrode potential produced on the measured interface upon the initial attainment of a rate of change of the current-potential relationship selected to be slightly greater than the rate of change occurring from the combined effects of rate of change of the corrosion rate and rate of disturbance by the polarizing D.C. current. The value of the polarizing D.C. current is measured by meter 15, usually in the form of a microammeter. The value of the polarized electrode potential is measured by voltmeter 9 of a class requiring negligible actuation current, connected to electrodes 1 and 4 through switch 11. Switch 10 is required when meter 9 measures D.C. voltage of single polarity.

The current-potential relationship may be undergoing drifting consequent to rate of change of corrosion rate occurring to the undisturbed corrosion interface. An example included within the specification illustrates that the corrosion current is generally undergoing a small rate of change produced by progress of the corrosion. The corrosion current may undergo larger rate of change when measurement is made while industrial operation alter ionic conductor composition or factors of environment such as temperature or flow rate. Within the measured range of current-potential relationship, the value of current required to produce a specific polarization voltage tends to be directly related to the corrosion current that determines the corrosion rate, according to details described later in the specification. Rate of change of the corrosion rate therefore tends to produce a corresponding rate of change of the current-potential relationship.

The current-potential relationship may also be undergoing drifting consequent to a rate of change produced by interface property disturbance by the polarizing D.C. current passed through the interface. The quantity of polarizing D.C. current passed in measuring the range of current-potential relationship may disturb properties of the electronic conductor surface and composition of the ionic conductor layer contacting the electronic conductor surface. The value of the polarizing D.C. current may become large enough with certain corrosion interface compositions to disturb the nature of the electrochemical reactions through which the corrosion current operates. The rate of change at which such disturbance may occur tends to increase with increase in quantity and value of the polarizing D.C. current, and to produce related rate of change of the current-potential relationship being measured.

During the measurement of a range of current-potential relationship, the rate of drifting may vary in magnitude and even reverse in direction. The drifting caused by rate of change of the corrosion rate is generally of a fixed direction and magnitude because of the speed with which the range of current-potential relationship is measured. The drifting caused by rate of disturbance by the polarizing D.C. current increases with increase in value and quantity of the polarizing D.C. current, and may operate in the same or opposite direction to that produced by rate of change of the corrosion rate.

In the method of this invention, value of polarizing D.C. current and polarized electrode potential are measured when the current-potential relationship initially undergoes a small rate of change selected to be slightly greater than the rate of drifting. Range of current-potential relationship is measured from a series of these measurements, with each measurement made when the current-potential relationship initially undergoes the same selected small rate of change. Data point scattering is thereby substantially eliminated by causing each point to be measured at a uniform extent of approach of the current-potential relationship toward the unattainable equilibrium. The time required to measure the range of current-potential relationship is thereby minimized, and this reduces the amount of drifting which may occur during the measurement. These features contribute to the accuracy with which the corrosion current may be measured.

The small rate of change in current-potential relationship determining the time for measuring value of polarizing D.C. current and polarized electrode potential is selected and measured as follows when the voltage delivery system is of the class delivering voltage increments with uniformity of voltage regulation.

When the corrosion occurs in the absence of changes made to ionic conductor composition and factors of corrosive environment, rate of change of the corrosion rate is small. The increment of D.C. voltage is applied, and observation is made at about 30 second intervals of value of polarizing D.C. current or polarized electrode potential, whichever is most indicative of rate of change of the current-potential relationship with the amount of voltage regulation selected for delivering the D.C. voltage. As soon as substantially no change of the current-potential relationship is observed over the 30 second time interval, measurement is made of the value of the polarizing D.C. current and the resulting polarized electrode potential. If the sensitivity of measurement is of the order of about 0.2%, the measurement is then made when the current-potential relationship is changing at a rate of about 0.2% per 30 seconds. The time lapse between application of the D.C. voltage increment and attainment of this selected slow rate of change depends mainly upon the nature of the measured corrosion interface and the size of the produced polarization voltage increment. With produced polarization voltage increment of the order of about 0.006 volt, this time lapse generally ranges from about one to three minutes.

When the corrosion occurs in the presence of factors tending to produce significant rate of change of the corrosion rate, such as during changes made in ionic conductor composition or factors of corrosive environment, it may become necessary to measure value of polarizing D.C. current and polarized electrode potential as soon as the current-potential relationship undergoes a change of about 2% during the 30 second time interval.

Measurement may alternatively be made upon the initial attainment of selected slow rate of change of the current-potential relationship measured indirectly. The size of successive D.C. voltage increment application is made uniform, and measurement is made of the value of polarizing D.C. current and polarized electrode potential at a uniform time lapse following each voltage increment application, of the order ranging from one to about three minutes as determined from performance factors considered above.

With a voltage delivery system of the class continuously delivering D.C. voltage at a substantially constant rate of change, the small rate of change in current-potential relationship determining the time for measuring value of polarizing D.C. current and polarized electrode potential is selected and measured through the rate of change at which the D.C. voltage is delivered. Depending upon corrosion interface performance factors considered above, the D.C. voltage may be continuously delivered at a rate from about 0.005 to 0.015 volt per minute when electrode 3 is of polarability comparable to electrode 1. If electrode 3 remains substantially unpolarized, rate of voltage delivery should be reduced by one-half. The value of polarizing D.C. current and polarized electrode potential may be measured at any instant of time during the voltage delivery, and may be continuously measured.

The range of the current-potential relationship is measured further by consecutive repetition of the steps of operating the D.C. voltage delivery system to produce successive and progressive change in the polarized electrode potential and of measuring value of polarizing D.C. current and polarized electrode potential with this repetition continued to produce measurement of the current-potential relationship within the desired range.

With the D.C. voltage delivery system selected from the class delivering successive increments of D.C. voltage with uniformity of voltage regulation, each successive operation of the voltage delivery system is made to produce a change in value of measured polarized electrode potential made small enough to define each Transition Point of line slope change occurring within the measured range of current-potential relationship. In a summary following later in the specification, of the forms in which measured range of current-potential relationship occur when graphed to linear voltage and current axes, a substantially linear current-potential relationship is observed to occur between consecutive Transition Points. The difference in voltage between each consecutively measured value of polarized electrode potential is therefore limited to less than one-half, or preferably one-third of the voltage difference occurring between consecutive Transition Points. Measurement is made of the value of polarizing D.C. current and resulting polarized electrode potential upon the initial attainment of the same selected small rate of change of the current-potential relationship, to avoid data point scattering.

With the D.C. voltage delivery system selected from the class continuously delivering D.C. voltage at a substantially constant rate of change, operation is adjusted to substantially maintain the same selected rate of change of delivered voltage. Measurement of value of polarizing D.C. current and resulting polarized electrode potential is made at instants of time separated by a time interval maintained small enough to define linear current-potential relationship between consecutive Transition Points from at least two and preferably three points of measurement. Alternatively, measurement may be continuously made and recorded.

The range of current-potential relationship may be measured from two consecutively made range measurements, with the one range measurement made in the direction of increasing polarizing D.C. current and the other range measurement made in the direction of decreasing polarizing D.C. current. Switch 16 is used to reverse the polarity of the delivered D.C. voltage. In general it is immaterial whether measurement made in the direction of increasing polarizing current is made first. The potential at which a Transition Point occurs may be measured with increased precision from an average of the two potentials defined in these two range measurements. The two values of polarizing D.C. current at which a Transition Point is defined in these two range measurements, tend to indicate the extent to which equilibrium of current-potential relationship is approached through the small rate of change in current-potential relationship selected to determine the time when measurement is made of the polarizing D.C. current and the polarized electrode potential, but this indication may be obscured by the occurrence of drifting. When one of these two range measurements may very occasionally show insufficient difference in line slope change to clearly define a Transition Point, the other range measurement will show sufficient difference in line slope change.

The form in which initial range of current-potential relationship occurs when measured by the method of this invention was investigated within the following scope of interface composition and operation.

*Electronic conductor composition.*—With metals ranging in electrochemical activity from magnesium to mercury; with a non-metallic element, in the form of carbon and graphite; and with a chemical compound, in the form of iron sulfide.

*Ionic conductor composition.*—Aqeous solutions, ranging in pH from 2 to 11; including acids, salts, and bases of inorganic and organic composition, throughout wide ranges of concentration; including non-ionized diluents as sugar and starch; including accelerators as oxidizing compounds; including inhibitors as film-forming types of inorganic compound, and as the adsorption type of organic compound; and including distilled water alone; non-aqueous solutions, as with the ionizing solvent in the form of dehydrated glycerine.

*Corrosive environment.*—Temperature ranging from below and above the freezing point of water; with and without dissolved oxygen; with and without flow of ionic conductor.

*Duration of corrosion.*—From immediately after formation of the corrosion interface through hundreds of hours of continued corrosion.

The form in which initial range of current-potential relationship occurs when measured by the method of this invention, and the range of shape variations occurring within this form, are illustrated in FIGURE 2. The location of zero potential on the linear voltage axis would be determined by the specific nature of reference electrode 4. The value of Free Electrode Potential $E_f$ would be characterized by the specific corrosion interface being measured. A common linear current axis shows D.C. current passed anodically and cathodically through the corrosion interface, to facilitate the operations of resolving which follow later. The current unit is unidentified to convey that graphical dimension of current unit is proportioned with respect to graphical dimension of voltage-unit to approximately cause the anodic and cathodic lines extending from potential $E_f$ to occur at an angle of about 45 degrees, for optimum graphical precision. Meter 15 generally measures microampere value of polarizing D.C. current. For the purpose of comparing various forms and amounts of distortion encountered in current-potential relationship range measurement, the relationship ranges in FIGURE 2 are shown with coinciding Transition Point potentials and Free Electrode Potentials, and with graphed size of current unit adjusted so that the corrosion current occurring at the Free Electrode Potential, as measured by the method of this invention described later in the specification, coincides with the 40 unit current value shown in the graph.

Relationships $E_f-C$, $E_f-C'$ and $E_f-C''$ broadly illustrate range of shape variation occurring with cathodic polarization, and relationships $E_f-A$ and $E_f-A'$ broadly illustrate range of shape variation occurring with anodic polarization. The measurement of a specific corrosion interface may produce a single cathodic relationship and a single anodic relationship approximating the shape of any combination of cathodic and anodic relationship shown in this figure.

Measurements made within the scope of interface composition and operation outlined above, demonstrate that initial range of current-potential relationship measured by the method of this invention is distinguished in form through the following characteristics illustrated in FIGURE 2.

(1) More than three Transition Points of line slope change occur in cathodic and in anodic range of current-potential relationship. Points 17, 19, 21, and 23 and their primed numbers show Transition Points occurring in cathodic relationships, and points 18, 20, 22, and 24 and their primed numbers show Transition Points occurring in anodic relationships.

(2) The Transition Points of line slope change are defined as points within the precision determined by sensitivity of voltage and current measurement.

(3) The Transition Points are characteristically separated by 0.02±0.002 volt differences in electrode potential.

(4) Range of current-potential relationship between consecutive Transition Points is linear within the precision obtained with potential measured within ±0.0015 volt senstivity and with current measured within comparable sensitivity in 45 degree line graphing. Data point scattering beyond this sensitivity of voltage and current measurement may be substantially eliminated. Successive measurements of the value of polarizing D.C. current and of resulting polarized electrode potential must be separated by less than 0.01 volt, and preferably less than 0.006 volt to define the line between consecutive Transition Points.

(5) A series of measurements made on the same corrosion interface over spaced time intervals during the corrosion may show the Transition Points occurring at substantially constant potentials. This is illustrated in Example 1 which follows later.

MEASUREMENT OF INTERFACE ELECTRODE SYSTEM

The type of electrode known to the art does not explain the form of current-potential relationship range shown in FIGURE 2. The most fundamental form of electrode known to the art consists of a single crystal surface area of pure elemental electronic conductor, such as iron, in contact with a non-gaseous ionic conductor of specific composition, operating according to specific conditions of environment, and the properties of Free Electrode Potential, anodic polarability and cathodic polarability as measured in the art, are characterized by the specific interface composition and conditions of operation. If each Transition Point measured the Free Electrode Potential of such an electrode, the potentials of the Transition Points would be irregularly and widely scattered consequent to unrelated variation in composition of microscopic constituents of the entire electronic conductor surface. An irregular order of line slope change would also be expected through consecutive Transition Points, caused by difference in relative anodic and cathodic polarability characteristic to each different electronic conductor surface, and this is contrary to the regular order of line slope change observed with cathodic relationship $E_f-C$ and anodic relationship $E_f-A$.

Furthermore, the type of electrode known to the art does not indicate how resolving operation may be applied to measured range of anodic and cathodic current-potential relationship to produce measurement of electrochemical corrosion mechanism. FIGURE 4 shows that the angle of slope change at a Transition Point 17 measures the relative anodic and cathodic polarbilities of the electrode having a Free Electrode Potential in $P_{a1}$, but does not measure the amount of these polarabilities. The current at which Transition Point 17 occurs measures the current separating point 31 from point 30, but the current at which point 30 occurs remains undetermined.

The method of this invention proceeds with measurement of the corrosion mechanism through the concept that the Transition Points measure the performance of Interface Electrodes which operate together as an Interface Electrode System residing within the interface formed between a single electronic conductor surface and a non-gaseous ionic conductor, and characterized by a uniform voltage separation between Free Electrode Potentials of the Interface Electrodes and by a characteristic inter-dependent order of anodic and cathodic current conduction described later in this specification. This concept is in accord with the following observations.

(1) The Transition Points occur at $0.02 \pm 0.002$ volt intervals throughout wide scope of variation made in interface composition and operation.

(2) The occurrence of the Transition Points is not diminished by reduction of corrosion interface area. Small interface areas of the order of one square millimeter, or of unidentified area such as occur in the early stages of failure of a protective film applied over the electronic conductor surface, show the same Transition Point definition as that obtained with large interface area.

(3) The regular order of line slope change occurring through consecutive Transition Points in cathodic relationship $E_f-C$ and anodic relationship $E_f-A$ of FIGURE 3 may be obtained when corrosion interface composition and operating conditions are varied within limits described below.

A detailed measurement of the Interface Electrode System requires measurement of the cathodic and anodic current-potential relationships of a corrosion interface when the distortions of drifting are minimized. A selection is made of the composition and operation of a corrosion interface to resist distortion by the polarizing D.C. current, and measurement is made by the method of this invention after the time interval required for the corrosion rate to approach negligible rate of change.

For example, the electronic conductor is a metal maintaining uniform surface composition throughout the corrosion, and may be taken in the form of a low carbon steel. The ionic conductor is buffered to minimize pH change which tends to be produced at anode and cathode surface by the polarizing D.C. current, and may be taken in the form of a buffered mildly acidic solution. The corrosion interface is operated in the absence of dissolved oxygen, at uniform temperature, and in the absence of vibration. The corrosion is allowed to proceed for the purpose of removing oxides from the metal surface and residuals of dissolved oxygen from the ionic conductor. The attainment of small rate of change of corrosion rate may be measured non-destructively and with ample measurement sensitivity by the method of corrosion current measurement described later in this specification. Measurement is then made by the method of this invention of initial range of current-potential relationship including a plurality of Transition Points, and polarity of the delivered D.C. voltage is reversed and a second measurement is made of this initial range.

The criteria for judging the extent to which distortion by the polarizing D.C. current has been eliminated is taken as the extent to which the graphed current-potential relationships show regular order of line slope change illustrated in FIGURE 2 by relationships $E_f-C$ and $E_f-A$. Increase of the polarizing D.C. current produces decrease of line slope as the relationship passes through Transition Points 17 and 19 of relationship $E_f-C$ and passes through Transition Points 18 and 20 of relationship $E_f-A$. This line slope change may be more specifically described through the relationship, $G=I/E$, where I is the current through which the line extends, E is the voltage through which the line extends, and G is the corrosion interface conductivity described by the line. The order of line slope change is one in which the lines describe increase of interface conductivity to occur with increase of polarizing D.C. current. The order in which this increase may occur is describable from resolving operation details which follow in this specification. In view of FIGURE 4, this regularity in line slope change may be regarded to measure a corresponding regular order of change in the relative anodic and cathodic polarabilities of the series of measured Interface Electrodes. The occurrence of this regular order of line slope change in measured current-potential relationship, is therefore regarded to indicate a minimizing of distortion, or drifting.

Measurement of the Interface Electrode System is illustrated with relationships $E_f-C$ and $E_f-A$, which are transferred from FIGURE 2 to FIGURE 3 for simplified line showing, and are shown in FIGURE 3 as heavy dash lines of the same lettering and numbering as in FIGURE 2. Moderate precisions of Interface Electrode System measurement may be obtained from measured range of current-potential relationship including the first two Transition Points in cathodic relationship and in anodic relationship. FIGURE 3 illustrates greater precision of measurement obtained with measurement of the first three Transition Points in anodic relationship and in cathodic relationship.

Current-potential relationships $E_f-C$ and $E_f-A$ are regarded as precision measurements of the current-potential resultants produced by the current-potential relationships of the Interface Electrode System operating as the components, and the Interface Electrode System is measured by resolving these resultants into the components. The operations of resolving reverse the order of steps made in describing FIGURE 4, and have the purpose of locating lines 28–30, 30–32, and others measuring anodic Total Interface Electrode Conduction, and line 29–31 and others measuring cathodic Total Interface Electrode Conduction from measured lines of current-potential relationship such as lines $E_f$–17, 17–49, and others not included in FIGURE 4. The operations of resolving require establishing a Current Difference Line 30–31 in movable position along a line $P_{a1}$–17 at the Free Electrode Potential of an Interface Electrode and of length equal to the value of current at Transition Point 17, and the similar establishing of a Current-Difference line in movable position along each other measured Free Electrode Potential line of an Interface Electrode. The resolving operations may therefore be accomplished through a mechanical device which materializes the Free Electrode Potential line of each Interface Electrode and the Current Difference Line movable thereon, and the anodic Total Interface Electrode Conduction Lines and the cathodic Total Interface Electrode Conduction Lines which are connected to the ends of the Current Difference Lines. The resolving operations may be more laboriously accomplished by repeated line positionings made on the graphed current-potential relationship ranges obtained by measurement, with these line positionings progressively adjusted toward meeting the final requirements.

The operations of resolving to measure the Interface Electrode System include the following steps.

Figure 6:
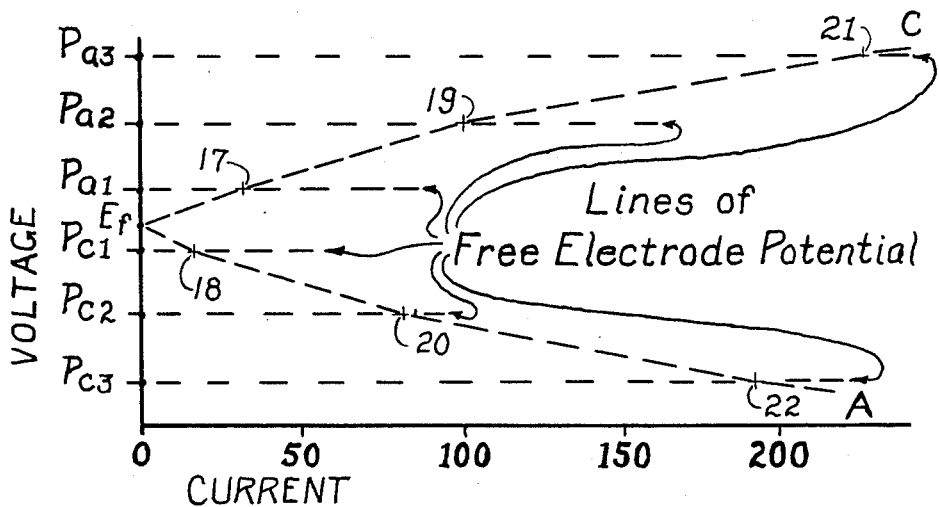

(1) From a linear voltage axis of graphed values of current-potential measurements made in accordance with the invention (as in FIGURE 5) a line of Free Electrode Potential of an Interface Electrode is established at the potential of each Transition Point in the measured cathodic current-potential relationship and a line of Free Electrode Potential of an Interface Electrode is established at the potential of each Transition Point in the measured anodic current-potential relationship, as diagrammatically shown in FIGURE 6. In FIGURE 3, the Free Electrode Potential lines $P_{a3}$–21, $P_{a2}$–19, and $P_{a1}$–17 of Interface Electrodes are defined at the potentials of Transition Points 21, 19, and 17 in measured cathodic current-potential relationship $E_f-C$, and the Free Electrode Potential lines $P_{c1}$–18, $P_{c2}$–20, and $P_{c3}$–22 of Interface Electrodes are defined at the potentials of Transition Points 18, 20, and 22 in measured anodic current-potential relationship $E_f-A$.

Figure 7:
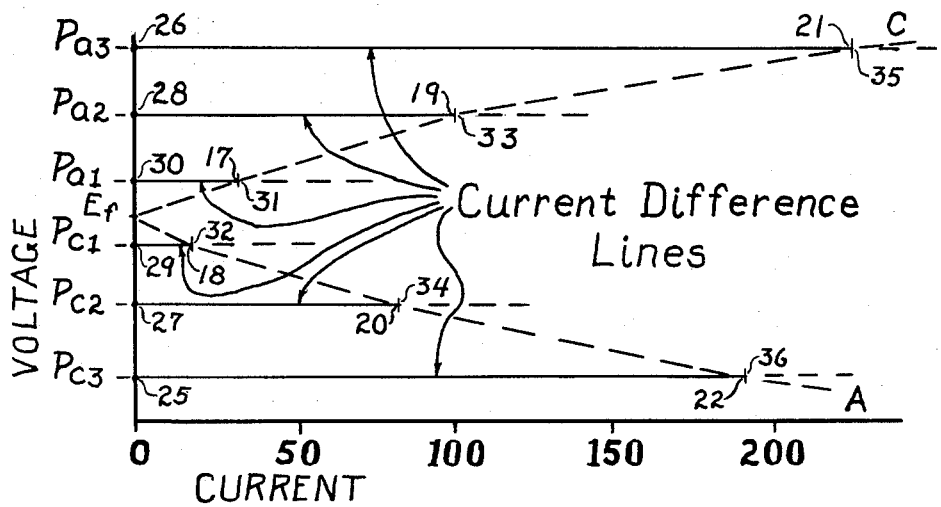
Figure 8:
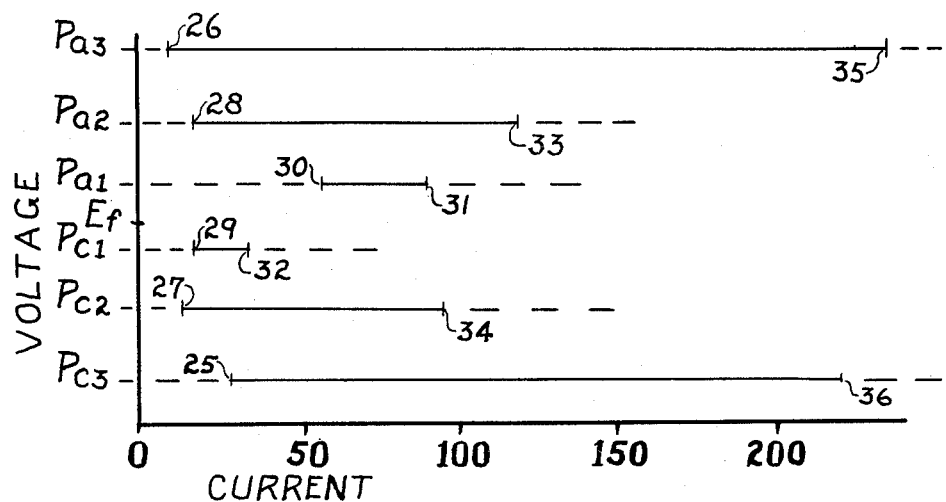

(2) A Current Difference Line is established in movable position along each Free Electrode Potential line and of length equal to the value of current of the Transition Point which defined the Free Electrode Potential line as measured from a common linear current axis, as diagrammatically shown in FIGURE 7. In FIGURE 3, line 26–35 is of length equal to the current at Transition Point 21, line 28–33 is of length equal to the current at Transition Point 19, line 30–31 is of length equal to the current at Transition Point 17, line 29–32 is of length equal to the current at Transition Point 18, line 27–34 is of length equal to the current at Transition Point 20, and line 25–36 is of length equal to the current at Transition Point 22. These lines may be regarded to occupy positions, as diagrammatically shown in FIGURE 8, other than those shown in FIGURE 3 until fixed in position by the final step of resolving.

Figure 9:
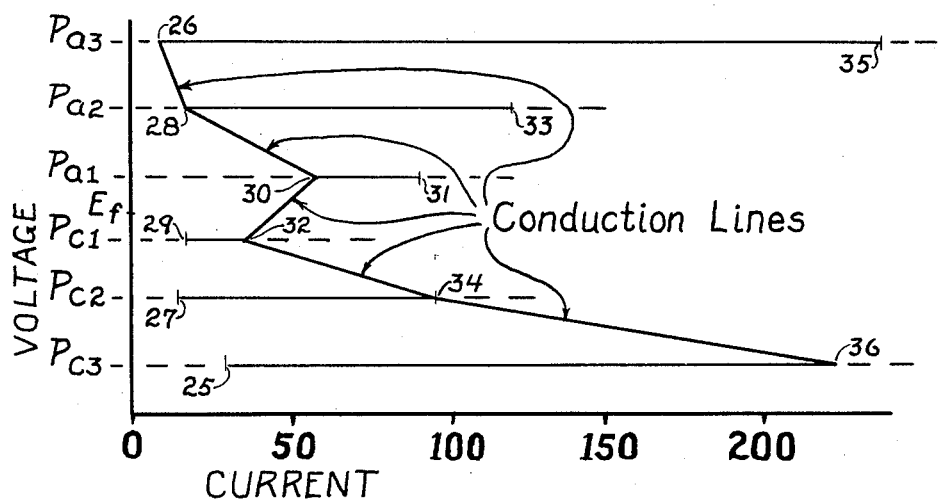

(3) A series of anodic Total Interface Electrode Conduction Lines is established in movable position dependent upon the positions of the Current Difference Lines, to consecutively connect the minimum current ends of the Current Difference Lines defined from measured cathodic current-potential relationship range, to connect the minimum current end of the Current-Difference Line of minimum polarization voltage defined from the measured cathodic current-potential relationship range with the maximum current end of the Current Difference Line of minimum polarization voltage defined from the measured anodic current-potential relationship range, and to consecutively connect the maximum current ends of the Current Difference Lines defined from measured anodic current-potential relationship range, as diagrammatically indicated in FIGURE 9. In FIGURE 3, lines 26–28, and 28–30 consecutively connect the minimum current ends of lines 26–35, 28–33, and 30–31; line 30–32 connects the minimum current end of line 30–31 with the maximum current end of line 29–32; lines 32–34 and 34–36 consecutively connect the maximum current ends of lines 29–32, 27–34, and 25–36.

Figure 10:
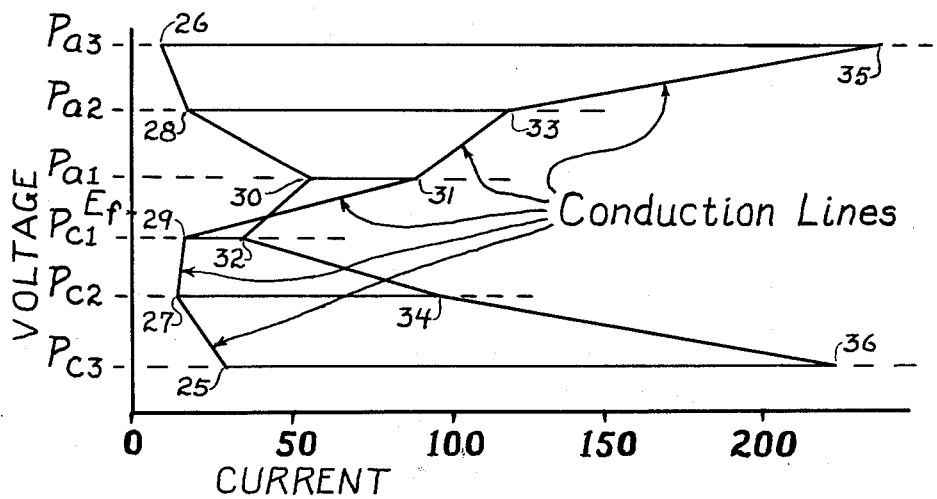

(4) A series of cathodic Interface Electrode Conduction Lines is established in movable position dependent upon the positions of the Current Difference Lines, to consecutively connect the maximum current ends of the Current Difference Lines defined from measured cathodic current-potential relationship range, to connect the maximum current end of the Current Difference Line of minimum polarization voltage defined from measured cathodic current-potential relationship range with the minimum current end of the Current Difference Line of minimum polarization voltage defined from measured anodic current-potential relationship range, and to consecutively connect the minimum current ends of the Current Difference Lines defined from measured anodic current-potential relationship range, as diagrammatically indicated in FIGURE 10. In FIGURE 3 lines 35–33 and 31–31 consecutively connect the maximum current ends of lines 26–35, 28–33, and 30–31; line 31–29 connects the maximum current end of line 30–31 with the minimum current end of line 29–32; lines 29–27 and 27–25 consecutively connect the minimum current ends of lines 29–32, 27–34, and 25–36.

Figure 11:
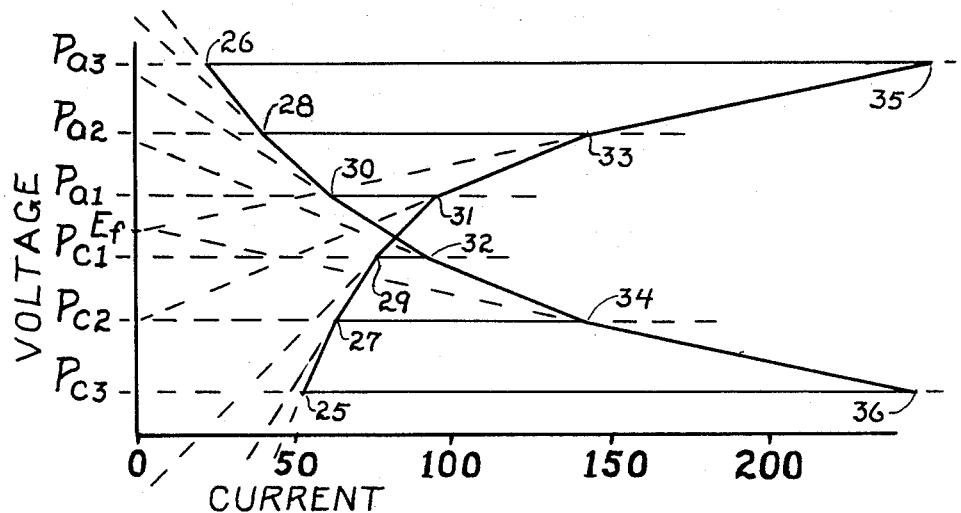
Figure 12:
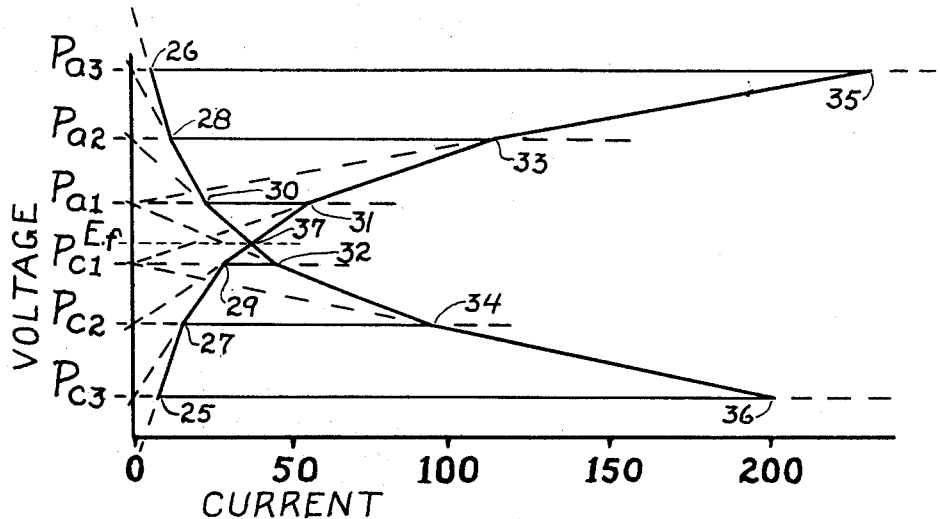

(5) This step applies the concept that the anodic and cathodic polarabilities of the Interface Electrodes are inter-related in the form of an Interface Electrode System performing according to mathematical regularity, as diagrammatically indicated in FIGURES 11 and 12. The Current Difference Lines are simultaneously adjusted to positions on the lines of Free Electrode Potential along which they are movable to locate the anodic Total Interface Electrode Conduction Lines in that regular order of conductivity increase occurring with increase of D.C. current in which the extension of each line intersects the voltage axis at a potential differing from the Free Electrode Potential from which the line extension was made by a substantially constant value of Anodic Line Slope Voltage, and to locate the cathodic Total Interface Electrode Conduction Lines in that regular order of conductivity increase occurring with increase of D.C. current in which the extension of each line intersects the voltage axis at a potential differing from the Free Electrode Potential from which the line extension was made by a substantially constant value of Cathodic Line Slope Voltage. FIGURE 3 shows the line positionings which simultaneously define value of Anodic Line Slope Voltage and value of Cadothic Line Slope Voltage. The extension of anodic Total Interface Electrode Conduction Line 32–30 from point 30 at potential $P_{a1}$ to the voltage axis, intersects the axis at potential $P_{a2}$. Other line extensions, not shown in the figure to avoid complexity, may be seen through application of a straight-edge to show that the extension of line 36–34 from potential $P_{c2}$ intersects the voltage axis at potential $P_{c1}$, the extension of line 32–34 from potential $P_{c1}$ intersects the voltage axis at potential $P_{a1}$, the extension of line 30–28 from potential $P_{a2}$ intersects the voltage axis at potential $P_{a3}$, and the extension of line 28–26 from potential $P_{a3}$ intersects the voltage axis at potential $P_{a4}$ which may be located in FIGURE 3 from its showing in FIGURE 4. The Anodic Line Slope Voltage shown in FIGURE 3 is equal to the potential difference between consecutive Transition Points, which is $0.02 \pm 0.002$ volt. Similarly, the extension of cathodic Total Interface Electrode Conduction Line 31–29 from point 29 at potential $P_{c1}$ to the voltage axis, intersects this axis at potential $P_{c2}$, and the application of a straight-edge will show that the extension of line 35–33 from potential $P_{a2}$ intersects the voltage axis at potential $P_{a1}$, the extension of line 33–31 from potential $P_{a1}$ intersects the voltage axis at potential $P_{c1}$, the extension of line 29–27 from potential $P_{c2}$ intersects the voltage axis at potential $P_{c3}$, and the extension of line 27–25 from potential $P_{c3}$ intersects the voltage axis at potential $P_{c4}$ which may be located in FIGURE 3 from its showing in FIGURE 4. Cathodic Line Slope Voltage shown in FIGURE 3 is equal to the potential difference between consecutive Transition Points, which is $0.02 \pm 0.002$ volt.

The finding that the Interface Electrode System residing within the corrosion interface is characterized by $0.02 \pm 0.002$ volt separation between consecutive Transition Points and by $0.02 \pm 0.002$ volt value of Anodic Line Slope Voltage and Cathodic Line Slope Voltage is substantiated by direct and indirect measurement. Direct measurement proceeds through the measurement of undistorted current-potential relationship ranges and the resolving operations described above, with variation between different measurements made in the selection of corrosion interface composition and operation required to resist distortion. A plurality of direct measurements confirm these characteristic voltages. Indirect measurement is made without limitation to interface composition and operation, to measure the corrosion current through simplified method steps based upon the existence of these characteristic voltages. Some of these simplified method steps are described next in this specification. A large volume of these measurements indirectly confirm the characteristic voltages through the accuracy with which the measured corrosion current measures corrosion rate. The direct measurement method described in detail above enables independent determination to be made of these characteristic voltages, and enables measurement to be made of other values for these voltages in the event that a corrosion interface of exceptional characteristics is encountered in practice.

GENERAL METHOD OF CORROSION CURRENT MEASUREMENT

Measurement is made of the corrosion current occurring with combinations of interface composition, corrosive environment and duration of corrosion which produce distortion in measured range of current-potential relationship through the concept that the value and quantity of polarizing D.C. current required to measure the first Transition Point are too small to cause significant distortion in the definition of this first Transition Point. This is illustrated in FIGURE 2 through the showing of various forms of distorted current-potential relationships compared with undistorted relationships $E_f-C$ and $E_f-A$. The distorted relationships are shown in the position of coinciding Transition Point potentials and Free Electrode Potential $E_f$, and with current units graphically proportioned so that the corrosion current occurring at the Free Electrode Potentials equals the 40 unit value defined by point 37 of FIGURE 3. Cathodic relationship $E_f-C''$ illustrates form of distortion produced by dissolved oxygen, in which line $19'-21''$ occurs when the cathodic depolarizing action of the dissolved oxygen is exceeded by the cathodic reducing action produced by the polarizing D.C. current. Cathodic relationship $E_f-C'$ may be caused by the alkaline film produced by passage of the polarizing D.C. current, in which the increasing pH reduces interface corrosion rate. In anodic relationship $E_f-A'$, line $22'-24'$ may be produced by the formation of a protective chemical film such as an oxide. Various other causes of distortion may occur to produce shape variations similar to those broadly illustrated in FIGURE 2. Distortion may cause a small shift in the current at which a first Transition Point occurs, as is shown by point $17'$ compared to undistorted point 17, but the extent of this shift disturbs corrosion current measurements by less than about 2%.

The corrosion current of the Interface Electrode System may accordingly be measured without restriction applied to interface composition, factors of corrosive environment, and duration of the corrosion, from a minimum range of measured current-potential relationship made to include definition of the first Transition Point, as follows.

(1) Measurement is made by the method of this invention of initial range of current-potential relationship substantially including the Free Electrode Potential and extending to include definition of the first Transition Point.

(2) A line of Free Electrode Potential of an Interface Electrode is established from a linear voltage axis at the potential of the first Transition Point. In FIGURE 2, this may be point 18 of measured anodic current-potential relationship, or it may be point 17 or $17'$ of measured cathodic current-potential relationship. For specific illustration, point 17 is taken, so that in FIGURE 3 Interface Electrode Potential line $P_{a1}-17$ is established.

(3) A line of Free Electrode Potential of the corrosion interface is established from measurement of the Free Electrode Potential or from an extrapolation of the measured current-potential relationship to zero current. In FIGURE 3, this line extends from potential $E_f$.

(4) The extension of a Total Interface Electrode Conduction Line is established in rotatable position through a point on the voltage axis at a polarization voltage greater than that of the Transition Point by the value of the characteristic Line Slope Voltage. In FIGURE 3, line 32–30 is rotatable through point $P_{a2}$ which is at a polarized electrode potential 0.02 volt greater than that of point $P_{a1}$.

(5) The extension of an opposed Total Interface Electrode Conduction Line is established in rotatable position through a point on the voltage axis at a potential of opposed polarization to that of the measured Transition Point and separated from the potential of the Transition Point by a voltage equal to the sum of the characteristic voltage separation between consecutive Transition Points and the characteristic value of the Line Slope Voltage. In FIGURE 3, line 31–29 is rotatable through point $P_{c2}$ which is separated from point $P_{a1}$ by the sum of the voltage difference, $P_{a1}-P_{c1}=0.02$ volt between consecutive Transition Points and the voltage difference, $$P_{c1}-P_{c2}=0.02$$

volt of the Line Slope Voltage.

(6) The intersection point of these two opposed Total Interface Electrode Conduction Lines is maintained in movable position along the line of Free Electrode Potential. In FIGURE 3, intersection point 37 is maintained in movable position along the potential line extending from potential $E_f$.

(7) This intersection point is adjusted to the value of current measured from a linear current axis which rotates the opposed Total Interface Electrode Conduction Lines to positions intercepting a value of current along the Free Electrode Potential line of the Interface Electrode equal to the value of current at which the Transition Point was measured. In FIGURE 3, intersection point 37 is moved to the position producing Current Difference Line 30–32 of length equal to the current at Transition Point 17. Point 37 then measures the corrosion current operating when the interface corrodes at the potential $E_f$.

Accuracy of the corrosion current measurement is improved through the measurement of both anodic and cathodic range of current-potential relationship, to measure the first Transition Point occurring on each side of the Free Electrode Potential of the corrosion interface. The resolving operation may then be made with the increased accuracy obtained through a Current Difference Line measured with anodic polarization and a Current Difference Line measured with cathodic polarization.

The accuracy with which interface corrosion rate is measured by the measured corrosion current of the Interface Electrode System depends upon the precision with which the current is measured by the method of this invention, and the extent to which this current determines the corrosion rate. The precision of the corrosion current measurement may be conveniently made of the order ±2%. The extent to which the corrosion current determines the corrosion rate cannot be directly determined, since no other method is known for measuring corrosion rate non-destructively and instantaneously. The determination must be made indirectly through comparison with a corrosion quantity-time measurement method, such as the weight loss method, through the following steps.

(1) Measurement is made of the initial weight of electrode 1. Opposed electrode 3 may be in the form of a duplication of electrode 1 and also measured to increase the precision of measurement, particularly that of the weight loss measurement.

(2) After forming the duplicated interfaces to be measured, a series of corrosion current measurements are made by the method of this invention at spaced time intervals throughout the progress of the corrosion. A corrosion current-time graph is made with a curve drawn through each measured point of corrosion current and time. The trend of this curve aids in defining the frequency and number of corrosion current measurements required.

(3) The corrosion current-time curve is integrated to a corrosion quantity-time curve through the application of Faraday's law of electrolysis, with anodic electrochemical reaction assumed to produce metal ions of valence equal to that found in the corrosion product. This corrosion quantity-time curve continuously predicts weighable metal loss.

(4) The corrosion is continued through a duration producing metal loss weighable within about ±5% precision, since this is generally the limit of precision within which metal loss occurs on the duplicated electrodes.

(5) When metal loss of selected quantity is measured by the corrosion quantity-time curve, the electrodes are removed from the corrosive and are immediately cleaned, dried, and subsequently weighed. The series of corrosion current measurements measured at spaced time intervals by the method of this invention when operated to measure the first Transition Point occurring on each side of the Free Electrode Potential, generally measures quantity of metal loss of value between the two quantities of metal loss weighed on the duplicated electrodes. When the weighed quantity of metal loss on duplicated electrodes is not in close agreement, a corrosion quantity-time curve may be separately measured on each electrode by the method of this invention.

Measurement may be made of the reduced corrosion rates produced by D.C. current passed through the corrosion interface to polarize it cathodically during the corrosion, through the following steps.

(1) Measurement is made of the polarized electrode potential produced by the applied cathodic protection current.

(2) Measurement is made of the Free Electrode Potential of the corrosion interface after removal of the cathodic protection current and when substantially no change in electrode potential occurs over a time interval of about 30 seconds. This generally requires about five minutes of time lapse.

(3) Measurement is made of the corrosion current of the Interface Electrode System occurring at the Free Electrode Potential. Application of the cathodic protection current may then be resumed.

(4) The reduced corrosion current produced by the cathodic protection current is calculated from the current-potential proportionalities in FIGURE 3, in which anodic Total Interface Electrode Conduction Lines 37–30, 30–28, 28–26, and additional lines obtainable through extrapolation, relate the corrosion current of point 37 at the Free Electrode Potential to the reduced corrosion current at the cathodic polarization voltage produced by the cathodic protection current.

Measurement may be made of the increased corrosion rate produced by D.C. current passed through the corrosion interface to polarize it anodically, through measurement steps similar to those applied in measuring the effect of cathodic protection. In FIGURE 3, anodic Total Interface Electrode Conduction Lines 37–32, 32–34, 34–36, relate the corrosion current of point 37 at the Free Electrode Potential to the increased corrosion current at the anodic polarization voltage produced by the anodic acceleration current.

It is sometimes found that the valence of metal ions produced in the anodic electrochemical reaction by the corrosion current of the Interface Electrode System is different from the valence of the metal ions found in the corrosion product, particularly in the presence of dissolved oxygen. When this occurs, it is found that the corrosion quantity-time curve may be related to the corrosion current-time curve through simple and exact mathematical expression which aids classification detail to anodic corrosion mechanism. This is taken as evidence that purely chemical corrosion reaction may sometimes follow after the initiating anodic electrochemical reaction to modify the corrosion products of the electrochemical reaction.

In the preceding portion of this specification, measurement method steps of the invention are clearly described, with obtainable forms of measured current-potential relationship range concisely summarized in FIGURE 2, and with detailed measurement of the electrochemical corrosion mechanism of the Interface Electrode System shown in FIGURE 3. The justification for the measurement method steps is confirmed through the range of application of the method and the accuracy with which it measures corrosion rate. The principal purpose of the examples which follow is to cite specific evidence of the scope and accuracy of the corrosion rate measurement.

*Example 1.—According to FIGURES 2 and 3*

The main purpose of this example is to illustrate precision Transition Point measurement and the accuracy of measured corrosion quantity-time relationship.

Electronic conductor 1 was steel sheet in the form of a strip 1.0 centimeter wide and 2.5 centimeter long, with both faces and three edges exposed. Electronic conductor 3 was a duplication of electronic conductor 1. Electrode surfaces were polished with #300 emery paper, and measurement was made of the initial weight of each electrode. An electrical lead wire was soldered to a tab portion of each electrode. The wire and tab of each electrode were mounted in a glass tube and sealed with wax. Major axes of the electrodes were vertically positioned at 1 inch separation with faces of the electrodes in a common plane, permissible with the ionic conductor of high conductivity.

The ionic conductor was 1-normal sulphuric acid made up with distilled water. It was initially deaerated by bringing to boiling temperature under a layer of white mineral oil, then cooled to room temperature and partially protected from atmospheric oxygen during corrosion by a ¼ inch layer of the oil. The electrodes were lightly scrubbed with wet pumice powder to produce surfaces free from "water-break" and then lowered into the ionic conductor through the oil layer. The film of water on the electrode surfaces avoided adhesion of the oil.

The corrosive environment included complete submersion of electronic conductors, no flow of ionic conductor, maintained deaeration, absence of vibration, and temperature of 22° C.

One saturated calomel reference electrode 4, of non-contaminating junction was positioned behind electronic conductor 1 at about ¼ inch separation, and a duplicated reference electrode was similarly positioned behind electronic conductor 3.

The voltage delivery system consisted of a potentiometer and center-tapped resistor each connected across the battery. The arm of the potentiometer was driven at constant speed. The voltage applied to the electrodes was taken from between the center-tap of the resistor and the arm of the potentiometer.

This voltage delivery system was adjusted to initially apply D.C. voltage to the electrodes in value defining the upper limit of the range of current-potential relationship to be measured. The voltage was then delivered at a substantially constant rate of change which decreased the applied voltage to zero and then increased it in reversed polarity to the upper limit of the range. The maximum applied voltage was selected to define two Transition Points on each side of the Free Electrode Potential of the corrosion interface, and was about 0.08 volt to produce about 0.04 volt polarization. The entire measurement was made in 24 minutes. Within the first 12 minutes the applied voltage decreased from 0.08 to zero volt, so that rate of applied D.C. voltage change was 0.08/12=0.007 volt per minute.

Measurement of the polarizing D.C. current and resulting polarized electrode potentials were continuously made and directly recorded on graph paper by an automatic device which alternately recorded the current-potential relationship of the anodically polarized electrode for 20 seconds and then recorded the current-potential relationship of the cathodically polarized duplicated electrode for 20 seconds, with these alternations continued throughout the 24 minutes of measurement. The graphed data was in the form of anodic and cathodic current-potential relationships, each measured with increasing and with decreasing values of polarizing D.C. current. Data scattering in measurement of linear relationship between consecutive Transition Points did not exceed the ±0.0015 volt sensitivity and ±10 microampere sensitivity through which the measurement device was operated.

The range of current-potential relationship including the first two Transition Points occurring on each side of the Free Electrode Potential of the corrosion interface were measured in this manner at 6.0 hours, 35.5 hours, and 59.0 hours after starting the corrosion. The corrosion was stopped at 60.0 hours by removal of electronic conductors 1 and 3 for weighing. Throughout this duration the electrodes remained in undisturbed contact with the ionic conductor.

The graphed data is precisely summarized through the following tabulation of the current and potential at which each Transition Point was measured, since current-potential relationship between consecutive Transition Points was linear within the electrical sensitivities of measurement. The original graphs may be reproduced from a graphing of these Transition Points. Some of the distortion illustrated in FIGURE 2 was encountered.

milligram loss of iron per microampere per ten hours of corrosion. Integration based upon this calculation produced a graphed corrosion quantity-time relationship of increasing slope, which predicted a 23.1 milligram loss at 60.0 hours.

The measurements made on this corrosion system by the method of the invention are regarded to have exerted negligible effect on total metal loss. The measurements

TABLE I.—TRANSITION POINT MEASUREMENT

| Measurement Number | Time of Measurement, Hours | Transition Point | Decreasing D.C. Voltage | | Increasing D.C. Voltage | | Averaged | |
|---|---|---|---|---|---|---|---|---|
| | | | Volts | Micro-amps. | Volts | Micro-amps. | Volts | Micro-amps. |
| 1 | 6.0 | $P_{a2}$ | 0.522 | 350 | 0.525 | 410 | 0.524 | 380 |
| | | $P_{a1}$ | 0.504 | 120 | 0.502 | 180 | 0.503 | 150 |
| | | $E_f$ | 0.492 | 0 | 0.492 | 0 | 0.492 | 0 |
| | | $P_{c1}$ | 0.488 | 100 | 0.482 | 100 | 0.485 | 100 |
| | | $P_{c2}$ | 0.466 | 420 | 0.465 | 610 | 0.466 | 516 |
| 2 | 35.5 | $P_{a2}$ | 0.529 | 670 | 0.525 | 460 | 0.527 | 565 |
| | | $P_{a1}$ | 0.508 | 230 | 0.504 | 100 | 0.506 | 165 |
| | | $E_f$ | 0.496 | 0 | 0.496 | 0 | 0.496 | 0 |
| | | $P_{c1}$ | 0.486 | 360 | 0.486 | 410 | 0.486 | 383 |
| | | $P_{c2}$ | 0.464 | 910 | 0.470 | 890 | 0.467 | 896 |
| 3 | 59.0 | $P_{a2}$ | 0.522 | 700 | 0.522 | 700 | 0.522 | 700 |
| | | $P_{a1}$ | 0.506 | 320 | 0.506 | 390 | 0.506 | 355 |
| | | $E_f$ | 0.495 | 0 | 0.495 | 0 | 0.495 | 0 |
| | | $P_{c1}$ | 0.481 | 680 | 0.486 | 360 | 0.484 | 520 |
| | | $P_{c2}$ | | (Averaged from above) | | | | 0.467 | |

Table I illustrates that each of the four measured Transition Points remain at characteristic potentials throughout the duration of the corrosion. The tabulation includes 16 measurements of the potential difference between consecutive Transition Points, which measure the average voltage difference as 0.0195 volt with an average deviation of ±0.0013 volt and with a maximum deviation of the order of ±0.0035 volt. Including other possible sources of error such as the accuracy of voltage measurement, and in view of a large volume of data of the type illustrated in Table I, this voltage separation is expressed as 0.02±0.002 volt throughout the specification.

The corrosion current occurring at the Free Electrode Potential was measured at the 6.0, 35.5 and 59.0 hour durations of the corrosion by the following method steps which may be reconstructed from the data of Table I. The averaged values of Transition Point definitions measured from decreasing and increasing applied D.C. voltage were graphed to a linear voltage axis and a common linear current axis. The Free Electrode Potential line of an Interface Electrode was established through each of the four Transition Points. Applying the lettering and numbering shown in FIGURE 3, the extension of an anodic Total Interface Electrode Conduction Line 32–30 was placed in rotatable position through potential $P_{a2}$ on the voltage axis, and the extension of a cathodic Total Interface Electrode Conduction Line 31–29 was placed in rotatable position through potential $P_{c2}$ on the voltage axis. These lines were then adjusted by repeated positionings to form the Current Difference Line 30–31 along potential $P_{a1}$ of length equal to the current of Transition Point 17, and to form the Current Difference Line 29–32 along potential $P_{c1}$ of length equal to the current of Transition Point 18. Intersection point 37 measured the corrosion current at the Free Electrode Potential of the corrosion interface. These resolving operations measured a corrosion current of 220 microamperes occurring at 6.0 hours after starting the corrosion, of 410 microamperes at 35.5 hours, and of 550 microamperes at 59.0 hours.

These three measured corrosion currents were graphed to a linear current axis and a linear time axis, and produced a substantially linear corrosion current-time relationship of positive slope. The corrosion current was regarded to operate through the anodic electrochemical reaction, $Fe = Fe^{2+} + 2(-)$, so that application of Faraday's law of electrolysis produced calculation of the factor, 0.0104 reported in this example required a total time lapse of 72 minutes. Thirteen measurements made according to the Simplified Method with reversed polarity, described in another division of this invention, required about 52 minutes. During the 58.0 hours when this corrosion system was not being measured, corrosion occurred at the Free Electrode Potential of the corrosion interface. The total time lapse for all measurements amounted to only 3.2% of the 60.0 hours. With each electrode, the measured polarizing D.C. current was passed in anodic direction for a total time equal to the total time passed in cathodic direction, so that the accelerating anodic action tends to be cancelled by the protecting cathodic action. In measurement of current-potential relationship range, the averaged polarizing D.C. current is of size comparable to the corrosion current, while the current measured with the Simplified Method may be much smaller than the corrosion current.

The corrosion was terminated at 60.0 hours by removal of the electronic conductors, and their surfaces were immediately rinsed and dried. The electrodes were removed from the electrode assemblies, the soldered connection was removed with the solder, and each electrode was weighed. Weighed metal losses were 23.0±0.5 and 24.0±0.5 milligrams.

The duplicated electrodes produced an average weight loss of 23.5 milligrams within a precision of $$\pm(100)(0.5/23.5) = \pm 2\%$$

The metal loss of 23.1 milligrams predicted by the method of this invention is within the values of metal loss obtained by weighing duplicated electrodes.

*Example 2.—Anodic Reaction Measurement*

One purpose of this example is to illustrate a corrosion system in which chemical reaction is regarded to follow quantitatively after the initiating electrochemical corrosion reaction measurable through the method of this invention. Another purpose is to illustrate accurate corrosion rate measurement of the protecting action of externally applied D.C. current polarizing the measured interface cathodically, and of the accelerating action of externally applied D.C. current polarizing the measured interface anodically.

The results of Simplified Method measurement, described in another division of this invention, indicated that the corrosion of pure aluminum in 0.5-N sulphuric acid occurred according to the anodic electrochemical reaction, $Al = Al^{1+} + 1(-)$, and that the addition of a small quantity of sodium chloride greatly accelerated corrosion rate and changed this anodic reaction to $Al = Al^{3+} + 3(-)$, which is in agreement with the corrosion products of $Al_2(SO_4)_3$ and $AlCl_3$. This anodic reaction of $Al^{1+}$ corrosion was further substantiated by the corrosion rate measured in 1-N sulphuric acid without sodium chloride addition.

A more elaborate confirmation of the anodic electrochemical reaction was obtained from the showing that externally generated D.C. current passed through the corrosion interface also operated according to the $Al^{1+}$ reaction, as follows.

Duplicated electronic conductors 1 and 3 of pure aluminum were immersed in ionic conductor 2 of 1-N sulphuric acid. An externally generated D.C. current $i_e$ was passed through the duplicated corrosion interfaces to polarize the electronic conductor 1 interface cathodically and to polarize the electronic conductor 3 interface anodically by polarization voltages selected from the Interface Electrode System of FIGURE 3 to produce a significant difference between the metal losses of the two electronic conductors. At selected instants of time during the corrosion, the following measurements were made. The cathodically polarized electrode potential $e_c$ of the electronic conductor 1 interface was measured, and the anodically polarized electrode potential $e_a$ of the electronic conductor 3 interface was measured. The D.C. current $i_e$ was measured and was then removed to allow both corrosion interfaces to attain the Free Electrode Potential, $e_f$. This required about 5 minutes, and potential $e_f$ was measured. The corrosion current $i_m$, then occurring at potential $e_f$, was measured in the manner described in Example 1. The D.C. current $i_e$ was then again applied and continued throughout the time interval extending to the next repetition of these measurements.

The corrosion currents operating upon the electronic conductor 1 and 3 interfaces in the presence of current $i_e$ passing through the interfaces were calculated from proportionalities of the Interface Electrode System of FIGURE 3 as follows. In FIGURE 3, intersection point 37 at potential $E_f$ measures corrosion current $I_m = 40$ current units. With the electronic conductor 1 interface, current $i_e$ produced a cathodic polarization voltage of $e_c - e_f$. Measurement was made in FIGURE 3 of the current $I_c$ defined by the anodic Total Interface Electrode Conduction Line relationship at a cathodic polarization voltage of the corrosion interface of FIGURE 3 equal to this voltage of $e_c - e_f$. The current corroding the electronic conductor 1 interface was then calculated as, $$i_c = i_m(I_c/I_m)$$

With the electronic conductor 3 interface, current $i_e$ produced an anodic polarization voltage of $e_f - e_a$. Measurement was made in FIGURE 3 of the current $I_a$ defined by the anodic Total Interface Electrode Conduction Line relationship at an anodic polarization of the corrosion interface of FIGURE 3 equal to this voltage of $e_f - e_a$. This current corroding the electronic conductor 3 interface was then calculated as, $i_a = i_m(I_a/I_m)$.

The values of $i_c$ and $i_a$ measured at selected time intervals throughout the corrosion were graphed to linear current and time axes and integrated to corrosion quantity-time relationships in the manner described in Example 1. Corrosion was continued until a time when the metal loss of electronic conductor 1 was predicted as 13.2 milligrams and the metal loss of electronic conductor 3 was predicted as 33.1 milligrams. The electronic conductors were then removed from the ionic conductor and weighed. The weight loss of electronic conductor 1 was 13 milligrams and that of electronic conductor 3 was 36 milligrams. The agreement obtained with these two methods of measuring metal loss confirms that the externally generated current $i_e$ also operates through the $Al^{1+}$ reaction, and illustrates the accuracy of measurement obtained from a range of the anodic Total Interface Electrode Conduction Line relationship.

*Example 3.—Acid Decomposition in Corroding a Noble Metal*

The corrosion of copper by dilute nitric acid is of interest because of certain hypotheses of long standing in the art. One hypothesis is that if metals are corroded by an electrochemical mechanism, the corroding metal must be more active than hydrogen in the Electromotive Series so that the cathodic reaction of $2H^+ + 2(-) = H_2$ can proceed to in turn permit an anodic reaction, $M = M^{n+} + n(-)$, to occur. Copper does not evolve hydrogen from a dilute non-oxidizing acid solution, and might therefore be excluded from the possibility of corroding by an electrochemical mechanism. In the corrosion of copper by dilute nitric acid, the nitrate ion is decomposed, which is more suggestive of corrosion by a purely chemical mechanism than by an electrochemical mechanism. It is therefore pertinent to determine the extent to which the Interface Electrode System measures the corrosion rate of the copper and nitric acid interface.

Using duplicated copper electrodes of 5 square centimeter area, totally immersed in 0.5-N nitric acid, a series of corrosion current measurements made in the manner described in Example 1, and spaced throughout a 35 hour duration of corrosion, predicted a 34.2 milligram metal loss according to the anodic reaction, $$Cu = Cu^{2+} + 2(-)$$

Metal loss by weighing was $36.0 \pm 0.5$ milligrams. This shows that the corrosion current of the Interface Electrode System determined the corrosion rate.

ALTERNATIVES

Electronic conductor 1 can be an elemental metal or an alloy, or a non-metallic element as carbon in the form of graphite, or a conductive chemical compound as iron sulfide. The Transition Points are measured with liquid mercury, indicating that they are not dependent upon a solid-state crystal structure.

The ionic conductor may be in the liquid state, or frozen to a solid, or in an intermediate jelled state. The ionizing solvent may be other than water. Electrolytes of all types and non-electrolytes may be dissolved in the solvent. Adherent corrosion products do not interfere with the corrosion current measurement.

The corrosion interface generally encountered in practice is of the irreversible class, meaning that the passage of current through the interface to polarize it cathodically does not cause the deposition of metal ions formed in the corrosion process. Corrosion may occur to the electronic conductor of a reversible interface, as a copper electrode in an acid copper plating bath. The method of this invention is applicable to measuring the corrosion current when recognition is made that part of the cathodic Interface Electrode reaction may include metal deposition, and therefore that comparison of predicted metal loss with weighed metal loss may indicate a valence of anodic reaction much higher than the valence found in the corrosion product.

Opposed electronic conductor 3, when not of the same substance as electronic conductor 1, is desirably of a substance which does not disturb the electronic conductor 1 interface. The ions of electronic conductor 3 should not operate in electrochemical replacement reaction with the substance of electronic conductor 1. Electronic conductor 3 may contact ionic conductor 2 through a second ionic conductor placed in non-contaminating contact with ionic conductor 2.

A number of alternative variations may be applied to the combination of shape, size, and opposed position of the corrosion interface to be measured and the separate and opposed interface for passing the D.C. current to limit the range within which resulting polarized electrode potential is produced by a measured value of polarizing D.C. current. In addition to those described and illustrated herewith, other combinations may include plane electronic conductor surfaces closing the ends of an insulating cylinder filled with the ionic conductor, the inside surface of a portion of spherical area containing ionic conductor and the concentrically positioned outside surface of spherical area of smaller radius, a rod positioned along the major axis of a pipe, and others, the utility of which is related to the accuracy required in the measurement.

Electronic conductor 4 can be in direct contact with ionic conductor 2, or may be in the form of a reference electrode with reference electrode ionic conductor contacting ionic conductor 2 through a non-contaminating junction.

Container 5 for holding the ionic conductor may range from an inert container in laboratory work to an ocean floor. Ionic conductor 2 may be of very small volume held between the surfaces of electronic conductors 1 and 3 by capillary attraction.

The broad function of member 6 is to electrically insulate electronic conductors 1, 3, and 4. The form in which it is used and the material of which it is made may vary with electronic conductor shape and position and according to conditions of environment as ionic conductor composition, temperature, pressure, and additional factors.

Opening 7 is for introducing and removing solids, liquids, and gases, and may alternatively be located in container 5 to continuously circulate the corrosive of an industrial process for the purpose of corrosion control.

A gaseous atmosphere 8 may be introduced above the surface of ionic conductor 2, to include the corrosive effect of its solution in the ionic conductor, or to exclude other gaseous atmosphere such as oxygen.

The method of this invention includes qualitative and quantitative applications of the characteristic form in which the Interface Electrode System occurs to measured initial range of current-potential relationship.

I claim:

1. In a method for measuring the corrosion current of the interface of an electronic conductor surface and a non-gaseous ionic conductor, the method of measuring a Transition Point of line slope change occurring in an initial range of current-potential relationship, which method comprises the steps of forming an area of the interface to be measured and an area of separate and opposed interface in a combination of shape and size and opposed position of the two interfaces selected to substantially maintain range of variation in value of polarized electrode potential subsequently produced on the interface to be measured within range of variation occurring to its Free Electrode Potential, establishing a reference electrode within the ionic conductor separated from the interface to be measured by a distance to include total polarization voltage in polarized electrode potential measurement and positioned to substantially exclude voltage produced by ionic conductor resistance to polarizing D.C. current subsequently passed between the two interfaces, selecting a D.C. voltage delivery system from a class producing substantially reproducible manner of approach of the current-potential relationship toward equilibrium values of current and potential, at a selected instant of time during the progress of the corrosion operating the D.C. voltage delivery system to deliver D.C. voltage to the electronic conductors of the opposed interfaces of value to polarize the interface to be measured to an electrode potential which defines one limit to a range of current-potential relationship substantially including the Free Electrode Potential and extending beyond the Transition Point of line slope change occurring at minimum polarization voltage in the linear relationship of voltage and current, measuring the value of the polarizing D.C. current and the value of the resulting polarized electrode potential upon the initial attainment of a rate of change of the current-potential relationship selected to be slightly greater than the rate of change occurring from the combined effects of rate of change of corrosion rate and rate of distortion of interface properties by the polarizing D.C. current, and repeating consecutively and successively and progressively the steps of operating the D.C. voltage delivery system and of measuring value of polarizing D.C. current and value of resulting polarized electrode potential to measure the range of current-potential relationship, with each of said operations of the voltage delivery system being so adjusted as to change the value of the polarized electrode potential to be measured by less than about one-half of the voltage difference between consecutive Transition Points of line slope change, and wherein each measurement of the value of polarizing D.C. current and resulting polarized electrode potential is made upon the initial attainment of the same selected small rate of change of the current-potential relationship, whereby each Transition Point of line slope change occurring in the measured range of current-potential relationship is measured at substantially a single value of current and at a substantially single value of potential regarded to measure the Free Electrode Potential of an Interface Electrode.

2. The method of claim 1, in which the D.C. voltage delivery system is selected from the class delivering the applied D.C. voltage with uniformity of voltage regulation, and in which the rate of change of current-potential relationship selected for determining the time of measuring value of polarizing D.C. current and resulting polarized electrode potential is within the range from about 0.2% to 2% of change over a time interval of about 30 seconds.

3. The method of claim 1, in which the D.C. voltage delivery system is selected from the class delivering the applied D.C. voltage continuously at a substantially constant rate of change, and in which the substantially constant rate of change of D.C. voltage delivery is selected within the range from about 0.005 to 0.015 volt per minute when delivered to the electronic conductors of opposed interfaces of comparable polarabilities and the values of polarizing D.C. current and resulting polarized electrode potential are measured at substantially the same instant of time.

4. The method of claim 1, in which the interface to be measured is of composition and constant conditions of operation selected to substantially resist distortion of the initial range of current-potential relationship by the polarizing D.C. current, and in which operation of the D.C. voltage delivery system is started at an instant of time selected after progress of the corrosion has produced a substantially constant corrosion rate and delivers D.C. voltage which defines one limit to a range of current-potential relationship extending beyond the first two Transition Points of line slope change occurring at minimum polarization voltages, immediately followed by repetition of the range measurement method steps made with reversed polarity of the applied D.C. voltage, positioning the measured values of current-potential relationship from a linear voltage axis and a linear current axis and accepting the measurement data as being reasonably free from distortion when the consecutive linear portions of measured current-potential relationship range show increase of interface conductivity to occur with increase of polarizing D.C. current, establishing the Free Electrode Potential Line of an Interface Electrode from the potential of each measured Transition Point located on a linear voltage axis, establishing a Current Difference Line in movable position along each Free Electrode Potential Line and of length as measured from a common linear current axis made equal to the value of current of the Transition Point which defined the Free Electrode Potential Line, establishing a series of anodic Total Interface Electrode Conduction Lines to consecutively connect the minimum current ends of the Current Difference Lines obtained from measured cathodic range of current-potential relationship and to connect the minimum current end of the Current Difference Line of smallest polarization voltage obtained from measured cathodic range of current-potential relationship with the maximum current end of the Current Difference Line of smallest polarization voltage obtained from measured anodic range of current-potential relationship and to consecutively connect the maximum current ends of the Current Difference Lines obtained from measured anodic range of current-potential relationship and in movable position dependent upon the positions of the Current Difference Lines, establishing a series of cathodic Total Interface Electrode Conduction Lines to consecutively connect the maximum current ends of the Current Difference Lines obtained from measured cathodic range of current-potential relationship and to connect the maximum current end of the Current Difference Line of smallest polarization voltage obtained from measured cathodic range of current-potential relationship with the minimum current end of the Current Difference Line of smallest polarization voltage obtained from measured anodic range of current-potential relationship and to consecutively connect the minimum current ends of the Current Difference Lines obtained from measured anodic range of current-potential relationship and in movable position dependent upon the positions of the Current Difference Lines, and simultaneously adjusting the Current Difference Lines to positions on the Free Electrode Potential Lines along which they are movable to locate the anodic Total Interface Electrode Conduction Lines in that regular order of conductivity increase occurring with increase of D.C. current in which the extension of each line intersects the voltage axis at a potential differing from the Free Electrode Potential Line from which the line extension is made by a substantially constant value of anodic Line Slope Voltage and to locate the cathodic Total Interface Electrode Conduction Lines in that regular order of conductivity increase occurring with increase of D.C. current in which the extension of each line intersects the voltage axis at a potential differing from the Free Electrode Potential Line from which the line extension is made by a substantially constant value of cathodic Line Slope Voltage, whereby the Interface Electrode System is measured.

5. The method of claim 1, in which no limitation is placed upon composition and operating conditions of the interface to be measured, and in which operation of the D.C. voltage delivery system may be started at any selected instant of time after formation of the interface to be measured, immediately followed by repetition of the range measurement method steps made with reversed polarity of the applied D.C. voltage, establishing the Free Electrode Potential Line of an Interface Electrode from the potential of the Transition Point of smallest polarization voltage in the measured cathodic range of current-potential relationship located on a linear voltage axis, establishing the Free Electrode Potential Line of an opposed Interface Electrode from the potential of the Transition Point of smallest polarization voltage in the measured anodic range of current-potential relationship located on a linear voltage axis, establishing the extension of an anodic Total Interface Electrode Conduction Line in rotatable position through a point on the voltage axis at the potential of polarization voltage exceeding that of the Transition Point of smallest polarization voltage in the measured cathodic range of current-potential relationship by the value of the characteristic anodic Line Slope Voltage of the Interface Electrode System, establishing the extension of a cathodic Total Interface Electrode Conduction Line in rotatable position through a point on the voltage axis at the potential of polarization voltage exceeding that of the Transition Point of smallest polarization voltage in the measured anodic range of current-potential relationship by the value of the characteristic cathodic Line Slope Voltage of the Interface Electrode System, and rotating these two opposed Total Interface Electrode Conduction Lines to positions simultaneously causing them to intercept a value of current along each of the two Free Electrode Potential Lines as measured from a common linear current axis equal to the value of current at which the Transition Point defining the Free Electrode Potential Line was measured, whereby the intersection point of the opposed Total Interface Electrode Conduction Lines measures the value of corrosion current of the Interface Electrode System when the corrosion interface corrodes at its Free Electrode Potential.

6. The method of claim 1, in which no limitation is placed upon composition and operating conditions of the interface to be measured, and in which operation of the D.C. voltage delivery system may be started at any selected instant of time after formation of the interface to be measured, followed by establishing the Free Electrode Potential Line of an Interface Electrode from the potential of the Transition Point of smallest polarization voltage located on a linear voltage axis, establishing the Free Electrode Potential Line of the corrosion interface from the potential located on the linear voltage axis of zero polarizing D.C. current defined from the measured range of current-potential relationship, establishing the extension of a Total Interface Electrode Conduction Line in rotatable position through a point on the voltage axis at the potential of polarization voltage exceeding that of the Transition Point by the value of the characteristic Line Slope Voltage of the Interface Electrode System, establishing the extension of an opposed Total Interface Electrode Conduction Line in rotatable position through a point on the voltage axis at a potential of opposed polarization to that of the measured Transition Point and separated from the potential of the Transition Point by a voltage equal to the sum of the characteristic voltage separation between consecutive Transition Points and the characteristic value of the Line Slope Voltage, maintaining the intersection point of these two opposed Total Interface Electrode Conduction Lines in movable position along the Free Electrode Potential Line of the corrosion interface, and adjusting this intersection point to the value of current measured from a linear current axis which rotates the two opposed Total Interface Electrode Conduction Lines to positions intercepting a value of current along the Free Electrode Potential Line of the Interface Electrode equal to the value of current at which the Transition Point was measured, whereby said intersection point measures the value of corrosion current of the Interface Electrode System occurring when the corrosion interface corrodes at its Free Electrode Potential.

7. The method of claim 1, in which no limitation is placed upon composition and operating conditions of the interface to be measured, and in which operation of the D.C. voltage delivery system may be started at any selected instant of time after formation of the interface to be measured, immediately followed by repetition of the range measurement method steps made with reversed polarity of the applied D.C. voltage, establishing the Free Electrode Potential Line of an Interface Electrode from the potential of the Transition Point of smallest polarization voltage in the measured cathodic range of current-potential relationship located on a linear voltage axis, establishing the Free Electrode Potential Line of an opposed Interface Electrode from the potential of the Transition Point of smallest polarization voltage in the measured anodic range of current-potential relationship located on a linear voltage axis, establishing the extension of an anodic Total Interface Electrode Conduction Line in rotatable position through a point on the voltage axis at the potential of polarization voltage exceeding that of the Transition Point of smallest polarization voltage in the measured cathodic range of current-potential relationship by the value of the characteristic anodic Line Slope Voltage of the Interface Electrode System, establishing the extension of a cathodic Total Interface Electrode Conduction Line in rotatable position through a point on the voltage axis at the potential of polarization voltage exceeding that of the Transition Point of smallest polarization voltage in the measured anodic range of current-potential relationship by the value of the characteristic cathodic Line Slope Voltage of the Interface Electrode System, and rotating these two opposed Total Interface Electrode Conduction Lines to positions simultaneously causing them to intercept a value of current along each of the two Free Electrode Potential Lines as measured from a common linear current axis equal to the value of current at which the Transition Point defining the Free Electrode Potential Line was measured, and at spaced time intervals during progress of the corrosion repeating said steps which produce measurement of initial anodic and cathodic range of current-potential relationship and measurement of the corrosion current therefrom, whereby measurement is made of the corrosion current-time relationship.

8. The method of claim 1, in which no limitation is placed upon composition and operating conditions of the interface to be measured, and in which operation of the D.C. voltage delivery system may be started at any selected instant of time after formation of the interface to be measured, followed by establishing the Free Electrode Potential Line of an Interface Electrode from the potential of the Transition Point of smallest polarization voltage located on a linear voltage axis, establishing the Free Electrode Potential Line of the corrosion interface from the potential located on the linear voltage axis of zero polarizing D.C. current defined from the measured range of current-potential relationship, establishing the extension of a Total Interface Electrode Conduction Line in rotatable position through a point on the voltage axis at the potential of polarization voltage exceeding that of the Transition Point by the value of the characteristic Line Slope Voltage of the Interface Electrode System, establishing the extension of an opposed Total Interface Electrode Conduction Line in rotatable position through a point on the voltage axis at a potential of opposed polarization to that of the measured Transition Point and separated from the potential of the Transition Point by a voltage equal to the sum of the characteristic voltage separation between consecutive Transition Points and the characteristic value of the Line Slope Voltage, maintaining the intersection point of these two opposed Total Interface Electrode Conduction Lines in movable position along the Free Electrode Potential Line of the corrosion interface, and adjusting this intersection point to the value of current measured from a linear current axis which rotates the two opposed Total Interface Electrode Conduction Lines to positions intercepting a value of current along the Free Electrode Potential Line of the Interface Electrode equal to the value of current at which the Transition Point was measured, and at space time intervals during progress of the corrosion repeating said steps which produce measurement of initial range of current-potential relationship and measurement of the corrosion current therefrom, whereby measurement is made of the corrosion current-time relationship.

References Cited in the file of this patent

Blum et al.: Transaction of the American Electrochemical Society, vol. 52, 1927, pp. 403–429.

Evans: "Metallic Corrosion, Passivity and Protection," published in 1946 by Arnold & Co., London, pages 19–21.